United States Patent
Zhang et al.

(10) Patent No.: US 10,944,615 B2
(45) Date of Patent: Mar. 9, 2021

(54) CONTROL APPARATUS, DEVICE AND METHOD, SIGNAL PROCESSING APPARATUS AND METHOD, AND MOBILE TERMINAL

(71) Applicants: Sony Corporation, Tokyo (JP); Zaichen Zhang, Nanjing (CN); Rong Zeng, Nanjing (CN); Pen-shun Lu, Beijing (CN)

(72) Inventors: Zaichen Zhang, Nanjing (CN); Rong Zeng, Nanjing (CN); Pen-shun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/332,800

(22) PCT Filed: Oct. 18, 2017

(86) PCT No.: PCT/CN2017/106658
§ 371 (c)(1),
(2) Date: Mar. 13, 2019

(87) PCT Pub. No.: WO2018/086447
PCT Pub. Date: May 17, 2018

(65) Prior Publication Data
US 2019/0207797 A1    Jul. 4, 2019

(30) Foreign Application Priority Data
Nov. 11, 2016    (CN) .......................... 201610997933.1

(51) Int. Cl.
*H04L 27/26*    (2006.01)
*H04W 56/00*    (2009.01)
*H04L 27/00*    (2006.01)

(52) U.S. Cl.
CPC .......... *H04L 27/2688* (2013.01); *H04L 27/00* (2013.01); *H04L 27/26* (2013.01);
(Continued)

(58) Field of Classification Search
CPC . H04L 27/2688; H04L 27/2695; H04L 27/26; H04L 27/2613; H04L 27/2657;
(Continued)

(56) References Cited

U.S. PATENT DOCUMENTS

2018/0212726 A1* 7/2018 Xue ........................ H04L 5/0048
2018/0270095 A1* 9/2018 Ahmad ............... H04J 13/0062

FOREIGN PATENT DOCUMENTS

| CN | 1320310 A | 10/2001 |
|----|-----------|---------|
| CN | 1347255 A | 5/2002 |

(Continued)

OTHER PUBLICATIONS

International Search Report dated Dec. 14, 2017 for PCT/CN2017/106658 filed on Oct. 18, 2017, 11 pages including English Translation.

*Primary Examiner* — Duc C Ho
(74) *Attorney, Agent, or Firm* — Xsensus LLP

(57) ABSTRACT

Provided are a control apparatus, device and method for a wireless communication system, a signal processing apparatus and method for a mobile terminal, a mobile terminal and a wireless communication system. The control apparatus comprises: a control circuit, wherein the control circuit is configured to make a plurality of the wireless communication devices send, to a mobile terminal, a plurality of synchronous sequence signals which are different from each other. According to the control apparatus, device and method, the signal processing apparatus and method, the mobile terminal and the wireless communication system in the present disclosure, the influence of a large-carrier fre-
(Continued)

quency offset on the performance of a timing synchronization system can be effectively suppressed and eliminated.

8 Claims, 12 Drawing Sheets

(52) U.S. Cl.
CPC ...... *H04L 27/2613* (2013.01); *H04L 27/2657* (2013.01); *H04L 27/2662* (2013.01); *H04L 27/2675* (2013.01); *H04L 27/2692* (2013.01); *H04W 56/001* (2013.01); *H04L 27/2695* (2013.01)

(58) Field of Classification Search
CPC ............. H04L 27/2662; H04L 27/2675; H04L 27/2692; H04W 56/001
See application file for complete search history.

(56) References Cited

FOREIGN PATENT DOCUMENTS

| | | | |
|---|---|---|---|
| CN | 102231893 | A | 11/2011 |
| CN | 102938754 | A | 2/2013 |
| CN | 105052051 | A | 11/2015 |
| EP | 2153572 | A1 | 2/2010 |

\* cited by examiner

CONTROL APPARATUS, DEVICE AND METHOD, SIGNAL PROCESSING APPARATUS AND METHOD, AND MOBILE TERMINAL

CROSS-REFERENCE TO RELATED APPLICATIONS

The present application is based on PCT filing PCT/CN2017/106658, filed on Oct. 18, 2017, which claims priority to Chinese Patent Application No. 201610997933.1, titled "CONTROL APPARATUS, DEVICE AND METHOD, SIGNAL PROCESSING APPARATUS AND METHOD, AND MOBILE TERMINAL", filed on Nov. 11, 2016 with the Chinese Patent Office, which is incorporated herein by reference in its entirety.

FIELD

The present disclosure relates to the field of wireless communications, and in particular to a control device and a control method for a wireless communication apparatus, a signal processing device and a signal processing method for a mobile terminal, a control apparatus, a mobile terminal and a wireless communication system, for effectively suppressing and eliminating influences on the performance of a timing synchronization system due to a Doppler frequency shift and a large carrier frequency shift.

BACKGROUND

In the future fifth generation mobile communication system, mobile communication is required to be implemented in high-speed mobile environments (such as a high-speed rail and an Internet of Vehicles) in which a moving speed is up to 500 km/h. Since spectrums with relatively low carrier frequencies have been used in the existing mobile communication system, relatively high carrier frequencies are to be used in the future mobile communication system. The higher moving speed and the higher carrier frequency may result in a larger Doppler effect, thus affecting the synchronization for a receiver. In addition, because of the higher carrier frequency, a carrier frequency shift due to the inconsistency between the crystal oscillator frequency of the receiver and that of a transmitter is significant, which results in significant deterioration of the performance of estimating the timing synchronization parameter by the receiver.

Based on the above, there are provided a control device and a control method for a wireless communication apparatus, a signal processing device and a signal processing method for a mobile terminal, a control apparatus, a mobile terminal and a wireless communication system according to the present disclosure, which can effectively suppress and eliminate influences on the performance of a timing synchronization system due to the Doppler frequency shift and the large carrier frequency shift.

SUMMARY

The brief summary of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as a preamble of the detailed description later.

In view of the above disadvantages in the conventional technology, at least one object of the present disclosure is to provide a signal processing device and a signal processing method for a wireless communication apparatus, a signal processing device and a signal processing method for a mobile terminal, a control apparatus, a mobile terminal and a wireless communication system, so as to solve at least the problems in the conventional technology.

According to an embodiment of the present disclosure, a control device for a wireless communication apparatus is provided, which includes control circuitry. The control circuitry is configured to cause a plurality of wireless communication apparatuses to transmit a plurality of synchronization sequence signals which are different from each other to a mobile terminal.

According to another embodiment of the present disclosure, a control apparatus including the aforementioned control device for a wireless communication apparatus is provided. The control apparatus is implemented by one of the plurality of wireless communication apparatuses or by a controller for the wireless communication apparatus.

According to yet another embodiment of the present disclosure, a signal processing device for a mobile terminal is provided, which includes a processing circuitry. The processing circuitry is configured to perform frequency shift pre-compensation on a plurality of synchronization sequence signals which are different from each other and received from a plurality of wireless communication apparatuses, so as to obtain absolute timing synchronization positions of the synchronization sequence signals based on the synchronization sequence signals having subjected to the frequency shift pre-compensation.

According to another embodiment of the present disclosure, a mobile terminal is provided, which includes a communication unit and processing circuitry. The communication unit is configured to receive a plurality of synchronization sequence signals which are different from each other and transmitted from a plurality of wireless communication apparatuses. The processing circuitry is configured to perform frequency shift pre-compensation on the plurality of synchronization sequence signals to obtain absolute timing synchronization positions of the synchronization sequence signals based on the synchronization sequence signals having subjected to the frequency shift pre-compensation, so that the mobile terminal receives signals from the wireless communication apparatuses based on the respective absolute timing synchronization positions.

According to an embodiment of the present disclosure, a control method for a wireless communication apparatus is provided, which includes: causing a plurality of wireless communication apparatuses to transmit a plurality of synchronization sequence signals which are different from each other to a mobile terminal.

According to another embodiment of the present disclosure, a signal processing method for a mobile terminal is provided, which includes: performing frequency shift pre-compensation on a plurality of synchronization sequence signals which are different from each other and which are transmitted from a plurality of wireless communication apparatuses to the mobile terminal, so as to obtain absolute timing synchronization positions of the synchronization sequence signals based on the synchronization sequence signals having subjected to the frequency shift pre-compensation, so that the mobile terminal receives signals from the wireless communication apparatuses based on the respective absolute timing synchronization positions.

According to the embodiment of the present disclosure, a wireless communication system is further provided, which includes a plurality of wireless communication apparatuses and a mobile terminal. The plurality of wireless communication apparatuses are configured to transmit a plurality of synchronization sequence signals which are different from each other to the mobile terminal. The mobile terminal is configured to receive the plurality of synchronization sequence signals which are different from each other and which are transmitted from the plurality of wireless communication apparatuses, and perform frequency shift pre-compensation on the plurality of synchronization sequence signals to obtain absolute timing synchronization positions of the plurality of synchronization sequence signals, so that the mobile terminal receives signals from the wireless communication apparatuses based on the absolute timing synchronization positions.

Furthermore, according to an embodiment of the present disclosure, a computer program for implementing the aforementioned control method and signal processing method is further provided.

In addition, according to an embodiment of the present disclosure, a computer readable storage medium is further provided. The computer readable storage medium stores computer program codes for implementing the aforementioned control method and signal processing method.

With the control device and control method for a wireless communication apparatus, the signal processing device and the signal processing method for a mobile teiuiinal, the control apparatus, the mobile terminal and the wireless communication system according to embodiments of the present disclosure, at least one of the following beneficial effects can be achieved. Influences on the performance of a timing synchronization system due to a Doppler frequency shift and/or a large carrier frequency shift can be effectively suppressed and eliminated; the timing synchronization parameter can be estimated without prior information; and a higher moving speed and a higher carrier frequency can be supported without modifying the design of the synchronization sequence.

Aforementioned and other advantages of the present disclosure will become clearer from the following detailed description of preferred embodiments of the present disclosure in conjunction with the drawings.

BRIEF DESCRIPTION OF THE DRAWINGS

The present disclosure may be understood better with reference to the detailed description given in conjunction with the drawings. Throughout all the drawings, the same or similar reference numerals indicate the same or similar components. The drawings together with the following detailed description are included in the specification and form a part of the specification, so as to illustrate preferred embodiments of the present disclosure by examples and explain principles and advantages of the present disclosure. In the drawings.

Figure 1:
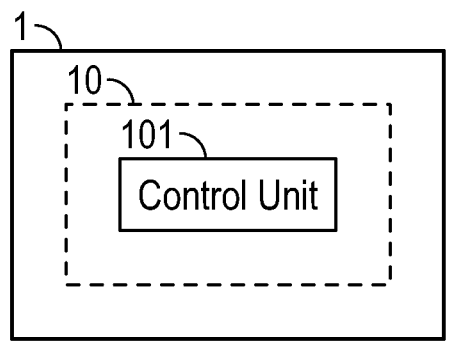
FIG. 1 shows a schematic diagram of a control device for a wireless communication apparatus according to an embodiment of the present disclosure.

Those skilled in the art should understand that elements in the drawings are illustrated only for simplicity and clarity, and are not necessarily drawn to scale. For example, dimensions of some of the elements in the drawings maybe enlarged relative to other elements, to facilitate understanding of the embodiments of the present disclosure.

DETAILED DESCRIPTION OF EMBODIMENTS

An exemplary embodiment of the present disclosure will be described hereinafter in conjunction with the drawings.

For conciseness and clarity, not all features of an actual embodiment are described in this specification. However, it should be understood that numerous implementation-specific decisions shall be made during developing any of such actual implementations so as to achieve specific targets of the developer, for example, to comply with constraining conditions related to system and business, which may change for different implementations. Furthermore, it should also be understood that although the development work may be complicated and time-consuming, for those skilled in the art benefiting from the present disclosure, such development work is only a routine task.

Here, it should further be noted that in order to avoid obscuring the present disclosure due to unnecessary details, only an apparatus structure and/or processing steps closely related to the solution of the present disclosure are illustrated in the accompanying drawing, and other details less related to the present disclosure are omitted.

Currently, in a high-speed mobile scenario, a mobile terminal estimates timing synchronization parameters mainly based on a synchronization sequence signal transmitted from a base station/roadside-unit (RSU). Generally, in a network in the high-speed mobile scenario, multiple base stations/RSUs in one logic cell transmit the same synchronization sequence signal. In this case, it is difficult to solve the problem of the severe influence suffered by the mobile terminal due to the carrier frequency shift and the Doppler frequency shift, which results in sharp deterioration in performances of estimating the timing synchronization parameter.

In order to solve the above technical problem, a control device and a control method for a wireless communication apparatus are provided according to the present disclosure, which cause a plurality of wireless communication apparatuses such as base stations and/or RSUs to transmit synchronization sequence signals which are different with each other, such that the Doppler frequency shift and/or the large carrier frequency shift can be suppressed or reduced, thereby improving the accuracy of estimating the timing synchronization parameter.

FIG. 1 shows a schematic diagram of a control device for a wireless communication apparatus according to an embodiment of the present disclosure. As shown in FIG. 1, a control device 1 for a wireless communication apparatus includes control circuitry 10, configured to cause a plurality of wireless communication apparatuses to transmit a plurality of synchronization sequence signals which are different from each other to a mobile terminal.

In addition, FIG. 1 further shows an example of a function module of the control circuitry 10. As denoted by a dashed line box in FIG. 1, the control circuitry 10 includes a control unit 101. It should be understood that the function module may be implemented by one or more control circuits. Alternatively, the function module may be implemented as a part of one control circuitry, or each function module may be implemented by multiple processing circuitry. In other words, the implementation of the function module is not limited. The control circuitry 10 may be, for example, a central processing unit (CPU), a microprocessor, an integrated circuit module or the like which is capable of processing data.

According to the present disclosure, the control circuitry 10 of the control device 1 for a wireless communication apparatus can control different wireless communication apparatuses (for example, base stations and RSUs) in one logic cell, so that the wireless communication apparatuses transmit synchronization sequence signals which are different from each other.

Figure 2:
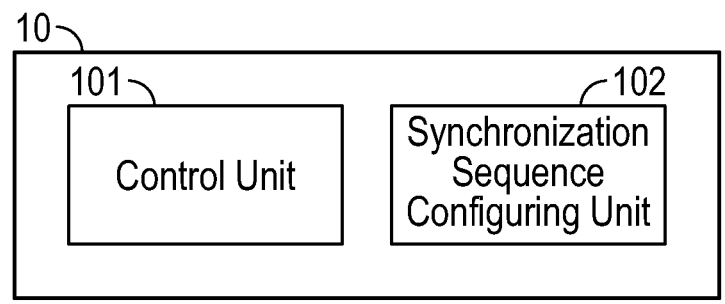
FIG. 2 shows a block diagram of an exemplary structure of control circuitry of the control device according to an embodiment of the present disclosure.

FIG. 2 shows a block diagram of an exemplary structure of the control circuitry of the control device according to an embodiment of the present disclosure. As shown in FIG. 2, in addition to the control unit 101 shown in FIG. 1, the control circuitry 10 further includes a synchronization sequence configuring unit 102, configured to configure each of the plurality of synchronization sequence signals to include a first sub-sequence and a second sub-sequence. The first sub-sequences of the synchronization sequence signals are the same, and the second sub-sequences of the synchronization sequence signals are cyclic shift sequences which are different from each other.

According to the present disclosure, the synchronization sequence configuring unit 102 is configured to configure the synchronization sequence signals transmitted from the plurality of wireless communication apparatuses which are managed by the control device, so as to allow a receiver to estimate the timing synchronization parameter more accurately and easier after receiving different synchronization sequence signals transmitted from the plurality of wireless communication apparatuses.

According to the present disclosure, the synchronization sequence configuring unit 102 can configure the synchronization sequence signal transmitted from each of the wireless communication apparatuses to include a first sub-sequence and a second sub-sequence. The first sub-sequences of the synchronization sequence signals transmitted from the wireless communication apparatuses are the same, and the second sub-sequences of the synchronization sequence signals transmitted from the wireless communication apparatuses are different from each other.

According to the present disclosure, a length of the first sub-sequence and a length of the second sub-sequence of each of the synchronization sequence signals transmitted from the wireless communication apparatuses may be equal or not.

Furthermore, according to a preferred embodiment of the present disclosure, the second sub-sequences of the synchronization sequence signals transmitted from the wireless communication apparatuses have a cyclic shift relationship with each other, and cyclic shift values between the second sub-sequences may be different.

Preferably, according to the embodiment of the present disclosure, the synchronization sequence configuring unit 102 is configured to calculate, based on a maximum geographical distance between adjacent wireless communication apparatuses which transmit the synchronization sequence signals, the cyclic shift values between second sub-sequences of the synchronization sequence signals transmitted from the wireless communication apparatuses, so as to avoid ambiguity of estimating when estimating the propagation time delay difference. Specifically, the cyclic shift value C may be calculated by the following formula (1):

$$\tau_{cs} > \left\lfloor \frac{d_{max}}{cT_s} \right\rfloor \quad (1)$$

where $d_{max}$ represents the maximum geographical distance between adjacent wireless communication apparatuses, represents the speed of light and $T_s$ represents a symbol period.

In addition, in order to suppress interferences on estimating the absolute timing synchronization parameters in the receiver end, so as to acquire an ideal correlation peak when the timing is synchronized, that is, to ensure a good performance of estimating propagation time delay difference and absolute timing positions, according to the embodiment of the present disclosure, the synchronization sequence configuring unit 102 preferably configures the first sub-sequence and the second sub-sequence of each of the synchronization sequence signals to satisfy the following conditions:

(1) an auto-correlation value indicating auto-correlation of each of the first sub-sequence and the second sub-sequence is low, and preferably, lower than a first predetermined threshold;

(2) a cross-correlation value indicating cross-correlation between the first sub-sequence and the second sub-sequence is lower than a second predetermined threshold; and (3) the second sub-sequence has a shift-and-add property.

More specifically, in order to suppress interference on estimating the absolute tuning synchronization parameters, according to the present disclosure, the synchronization sequence configuring unit 102 preferably configures each of the first sub-sequence and the second sub-sequence of each of the synchronization sequence signals to have a good auto-correlation, that is, a low auto-correlation value.

The auto-correlation value is a calculation result obtained by multiplying a sequence and a cyclic shift sequence of the sequence bit by bit, then adding the obtained products together, and normalizing the obtained sum using a length of the sequence. An auto-correlation function $R_a(\tau)$ may be expressed by the following formula (2):

$$R_a(\tau) = \frac{1}{N}\sum_{i=1}^{N} a_i a_{i+\tau} \tag{2}$$

where $\{a_i\}$ represents a sequence with a length N, and $\{a_{i+\tau}\}$ represents a sequence of $\{a_i\}$ subjected to a right cyclic shift by $\tau$ bits.

The good auto-correlation indicates that an absolute value of the auto-correlation function $R_a(\tau)$ goes to zero in a case that $\tau$ is not equal to zero, that is:

$$|R_a(\tau)| \to 0 \; \tau \neq 0 \tag{3}$$

According to the preferred embodiment of the present disclosure, the synchronization sequence configuring unit 102 uses a sequence having an auto-correlation value tending to be zero as the first sub-sequence and/or the second sub-sequence according to the embodiment of the present disclosure.

In addition, in order to suppress interference between the two sub-sequences when estimating the absolute timing synchronization parameters (specifically, estimating a difference of time of arrival), according to the present disclosure, the synchronization sequence configuring unit 102 preferably configures the two sub-sequences of each of the synchronization sequence signals to have a good cross-correlation, that is, a low cross-correlation value.

The cross-correlation value refers to a calculation result obtained by multiplying a sequence and a cyclic shift sequence of another sequence bit by bit, then adding the obtained products together, and normalizing the obtained sum using a length of the sequence. A cross-correlation function $R_{ab}(\tau)$ may be expressed by the following formula (4):

$$R_{ab}(\tau) = \frac{1}{N}\sum_{i=1}^{N} a_i b_{i+\tau} \tag{4}$$

where $\{a_i\}$ and $\{b_i\}$ represent two sequences with a length N which are different from each other.

The low cross-correlation value indicates that an absolute value of the cross-correlation function $R_{ab}(\tau)$ goes to zero in a case that $\tau$ is equal to any value, that is:

$$|R_{ab}(\tau)| \to 0 \tag{5}$$

Due to the good cross-correlation (that is, the low cross-correlation value), the interference of the second sub-sequence on the first sub-sequence can be reduced when estimating the propagation time delay difference parameter.

According to the preferred embodiment of the present disclosure, the synchronization sequence configuring unit 102 preferably uses two sequences of which the cross-correlation value goes to zero as the first sub-sequence and the second sub-sequence of the synchronization sequence signal according to the embodiment of the present disclosure.

The first predetermined threshold and the second predetermined threshold according to the present disclosure may be determined in advance by those skilled in the art based on empirical values. Preferably, each of the first predetermined threshold and the second predetermined threshold is set to be as small as possible.

In addition, in order to ensure that the second sub-sequence having subjected to a conjugate multiplication operation still has a good auto-correlation when estimating the absolute timing synchronization parameters in the receiver end, so as to suppress interference when determining the timing synchronization estimation parameter (that is, to acquire the ideal correlation peak of the second sub-sequence to acquire the absolute timing synchronization position), according to the present disclosure, the synchronization sequence configuring unit 102 preferably configures the second sub-sequence of each of the synchronization sequence signals to have a good shift-and-add property.

The shift-and-add property indicates that a result acquired by adding a sequence and a cyclic shift sequence of the sequence bit by bit is another cyclic shift sequence of the sequence. For example, a sequence $\{a_i\}$ satisfying the following formula (6) may be determined as having the shift-and-add property:

$$\{a_i\} \oplus \{a_{i+\tau}\} = \{a_{i+\tau'}\} \tag{6}$$

where sequences $\{a_{i+\tau}\}$ and $\{a_{i+\tau'}\}$ represent cyclic shift sequences of the sequence $\{a_i\}$.

According to the preferred embodiment of the present disclosure, the synchronization sequence configuring unit 102 may adopt a preferred pair of maximum periodic linear shift register sequences as the first sub-sequence and the second sub-sequence of the synchronization sequence signal.

Here, $\{a_i\}$ and $\{b_i\}$ represent two sequences in the preferred pair of maximum periodic linear shift register sequences. Apparently, the maximum periodic linear shift register sequence has a property expressed by the following formula (7):

$$R_a(\tau) = R_b(\tau)\frac{1}{N}\sum_{i=1}^{N} a_i a_{i+\tau} = \begin{cases} 1 & \tau = 0 \\ -\frac{1}{N} & \tau \neq 0 \end{cases} \tag{7}$$

where $R_a(\tau)$ and $R_b(\tau)$ respectively represent the auto-correlation functions of the first sub-sequence $\{a_i\}$ with a length N and the auto-correlation function of the second sub-sequence $\{b_i\}$ with a length N.

$\{a_i\}$ and $\{b_i\}$ are the preferred pair of maximum periodic linear shift register sequences, thus:

$$|R_{ab}(\tau)| \leq \begin{cases} 2^{\frac{p+1}{2}} + 1 & P \text{ is an odd number} \\ 2^{\frac{p+2}{2}} + 1 & P \text{ is an even number and not a multiple of 4} \end{cases} \quad (8)$$

where the cross-correlation function $R_{ab}(\tau)$ represents a cross-correlation function between the auto-correlation function of the first sub-sequence $\{a_i\}$ with a length N and the auto-correlation function of the second sub-sequence $\{b_i\}$ with a length N, and $p=\log_2(N+1)$.

In addition, since the sequence $\{b_i\}$ is the maximum periodic linear shift register sequence and has the shift-and-add property, the preferred pair of maximum periodic linear shift register sequences $\{a_i\}$ and $\{b_i\}$ satisfy the above conditions.

In this example, for example, the first predetermined threshold may be set as $$\frac{1}{N},$$

and the second predetermined threshold may be set as $$2^{\frac{p+1}{2}} + 1 \text{ and } 2^{\frac{p+2}{2}} + 1.$$

After the synchronization sequence configuring unit 102 configures each of the synchronization sequence signals to be transmitted from the wireless communication apparatuses, the control unit 101 can control the wireless communication apparatuses to transmit synchronization sequence signals which are different with each other. The first sub-sequences of the synchronization sequence signals transmitted from the wireless communication apparatuses are the same, that is, the same sequence $\{a_i\}$. The second sub-sequences of the synchronization sequence signals transmitted from the wireless communication apparatuses are different cyclic shift sequences of the sequence $\{b_i\}$.

Figure 3:
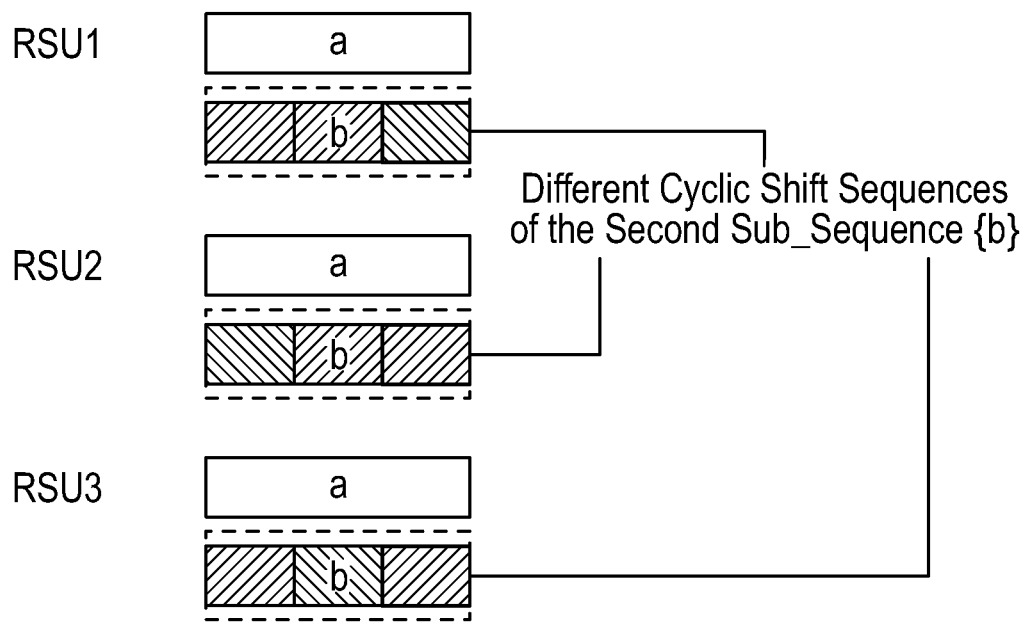
FIG. 3 shows a schematic diagram of an example of synchronization sequence signals transmitted from wireless communication apparatuses.

FIG. 3 shows a schematic diagram of an example of synchronization sequence signals transmitted from wireless communication apparatuses. As shown in FIG. 3, the first sub-sequences $\{a_i\}$ of synchronization sequence signals transmitted from wireless communication apparatuses RSU1, RSU2 and RSU3 are the same, and the second sequences $\{b_i\}$ of the synchronization sequence signals transmitted from wireless communication apparatuses RSU1, RSU2 and RSU3 have a cyclic shift relationship with each other.

Although FIG. 3 shows an example in which three wireless communication apparatuses transmit different synchronization sequences, the present disclosure is not limited to the example. Those skilled in the art should understand that the control device according to the present disclosure may control two or more than three wireless communication apparatuses to transmit different synchronization sequences.

The control device 1 according to the present disclosure may be provided in any one of the plurality of wireless communication apparatuses which are configured to transmit synchronization sequence signals, or in a separate controller which is configured to control the plurality of wireless communication apparatuses for transmitting synchronization sequence signals.

With the control device according to the present disclosure, the plurality of wireless communication apparatuses are controlled to transmit synchronization sequence signals which are different with each other, so that the mobile terminal can perform frequency shift pre-compensation on the received synchronization sequence signals, and acquire, for each of the synchronization sequence signals, the absolute timing synchronization position of the synchronization sequence signal based on the synchronization sequence signal having subjected to the frequency shift pre-compensation, thereby eliminating interference on acquiring the absolute timing synchronization positions due to the Doppler frequency shift and the large carrier frequency shift.

The control device controls the plurality of wireless communication apparatuses to transmit a plurality of synchronization sequence signals which are different from each other. Then, in the receiver end, the receiver such as the mobile terminal receives the plurality of synchronization sequence signals, and performs timing synchronization signal processing including frequency shift pre-compensation on the received plurality of synchronization sequence signals, to acquire absolute timing synchronization positions of the received synchronization sequence signals, so that the receiver normally receives signals from the plurality of wireless communication apparatuses.

According to the present disclosure, a signal processing device for a mobile terminal is further provided. The signal processing device performs signal processing on the synchronization sequence signals which are different from each other and transmitted from the plurality of wireless communication apparatuses.

Figure 4:
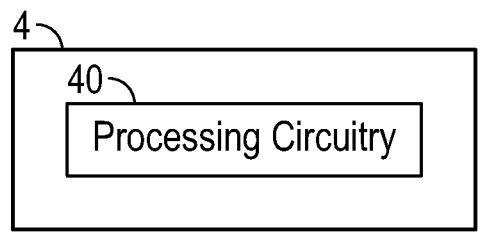
FIG. 4 shows a signal processing device for a mobile terminal according to an embodiment of the present disclosure.

FIG. 4 shows a signal processing device for a mobile terminal according to an embodiment of the present disclosure. As shown in FIG. 4, a signal processing device 4 includes processing circuitry 40. The processing circuitry is configured to perform frequency shift pre-compensation on a plurality of synchronization sequence signals which are different from each other and received from the plurality of wireless communication apparatuses, to obtain absolute timing synchronization positions of the plurality of synchronization sequence signals based on the synchronization sequence signals having subjected to the frequency shift pre-compensation, so that the mobile terminal receives signals from the wireless communication apparatuses based on the absolute timing synchronization positions.

The signal processing device 4 receives a plurality of synchronization sequence signals which are different from each other and transmitted from the plurality of wireless communication apparatuses. According to the present disclosure, the plurality of synchronization sequence signals which are different from each other may be the synchronization sequence signals which are transmitted from the plurality of wireless communication apparatuses under control of the aforementioned control device according to the present disclosure. Therefore, the plurality of synchronization sequence signals which are different from each other and received by the signal processing device may be the synchronization sequence signals which are configured by the synchronization sequence configuring unit described with reference to FIGS. 1 to 3.

For example, the received plurality of synchronization sequence signals may have the respective first sub-sequences which are the same and the respective second sub-sequences which are different from each other. Preferably, the first sub-sequence and the second sub-sequence satisfy the following conditions:

(1) an auto-correlation value indicating auto-correlation of each of the first sub-sequence and the second sub-sequence is low, and preferably, lower than a first predetermined threshold;

(2) a cross-correlation value indicating cross-correlation between the first sub-sequence and the second sub-sequence is lower than a second predetermined threshold; and (3) the second sub-sequence has a shift-and-add property.

Figure 5:
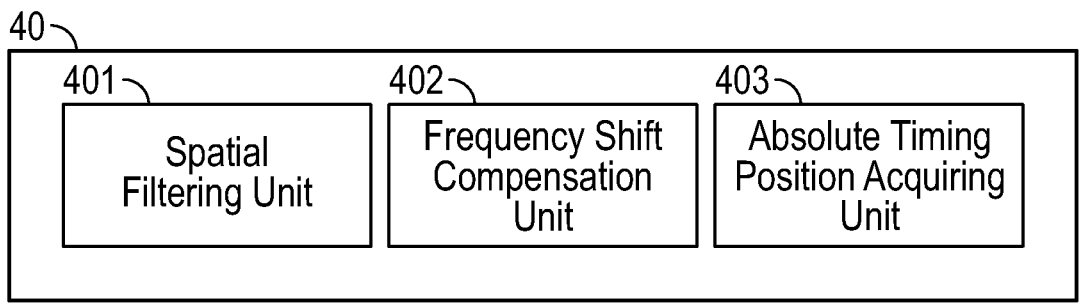
FIG. 5 shows a block diagram of an exemplary structure of processing circuitry 40 of a signal processing device 4 according to an embodiment of the present disclosure.

FIG. 5 shows a block diagram of an exemplary structure of the processing circuitry 40 of the signal processing device 4 according to an embodiment of the present disclosure.

As shown in FIG. 5, the processing circuitry 40 includes: a spatial filtering unit 401, a frequency shift compensation unit 402, and an absolute timing position acquiring unit 403. The spatial filtering unit 401 is configured to perform spatial filtering on the plurality of synchronization sequence signals which are different from each other and received from wireless communication apparatuses. The frequency shift compensation unit 402 is configured to perform the Doppler frequency shift pre-compensation and/or the carrier frequency shift pre-compensation on each of the synchronization sequence signals having subjected to the spatial filtering. The absolute timing position acquiring unit 403 is configured to determine the absolute timing synchronization positions of the synchronization sequence signals based on the synchronization sequence signals having subjected to the frequency shift pre-compensation.

According to the embodiment of the present disclosure, the spatial filtering unit 401 performs spatial orthogonal segmentation filtering on the simals received by multiple antennas of the mobile terminal, that is, the plurality of synchronization sequence signals which are different from each other and transmitted from the plurality of wireless communication apparatuses, to group the received signals into different spatial domains, so as to distinguish the received plurality of synchronization sequence signals from each other, thereby acquiring the received plurality of synchronization sequence signals corresponding to the synchronization sequence signals transmitted from the plurality of wireless communication apparatuses. More specifically, the spatial filtering unit 401 performs spatial filtering on the received synchronization sequence signals using the following formula (9):

$$y^a = Fy \quad (9)$$

where y represents a signal vector with a length $n_r$ of the received synchronization sequence signal, $y^a$ represents a signal vector with a length $n_r$ of the received synchronization sequence signal having subjected to the spatial filtering, and F represents a spatial orthogonal segmentation filtering matrix containing $n_r \times n_r$ elements, an element of the k-th row in the matrix corresponds to a filter coefficient of the k-th filter, and a length of the row is $n_r$.

Filter coefficients of the respective filters may be determined by using a method such as minimum equivalent wavenumber spectral extension. According to the present disclosure, filter coefficients of the respective filters are determined based on only a shape of a receiving antenna array, without estimating angles of arrival. Therefore, the filter coefficients may be acquired in advance by offline calculation. The method for determining the filter coefficients is well known in the art, and thus is not described in detail herein.

After the spatial filtering unit 401 performs spatial filtering on the received plurality of synchronization sequence signals, the frequency shift compensation unit 402 performs frequency shift pre-compensation, including Doppler frequency shift pre-compensation and/or carrier frequency shift pre-compensation, on the synchronization sequence signals having subjected to the spatial filtering. After the frequency shift pre-compensation is performed on the synchronization sequence signals, the absolute timing position acquiring unit 403 determines the absolute timing synchronization positions of the plurality of synchronization sequence signals based on the synchronization sequence signals having subjected to the frequency shift pre-compensation.

In a high-speed mobile scenario, a majority of signals received by the mobile terminal from the plurality of wireless communication apparatuses have low powers, which have no practical significance. Therefore, in the process of signal processing, only several synchronization sequence signals having the largest received signal power are selected to be processed to determine the absolute timing synchronization positions of the synchronization sequence signals according to the present disclosure, thereby improving efficiency in determining the absolute timing synchronization positions.

Figure 6:
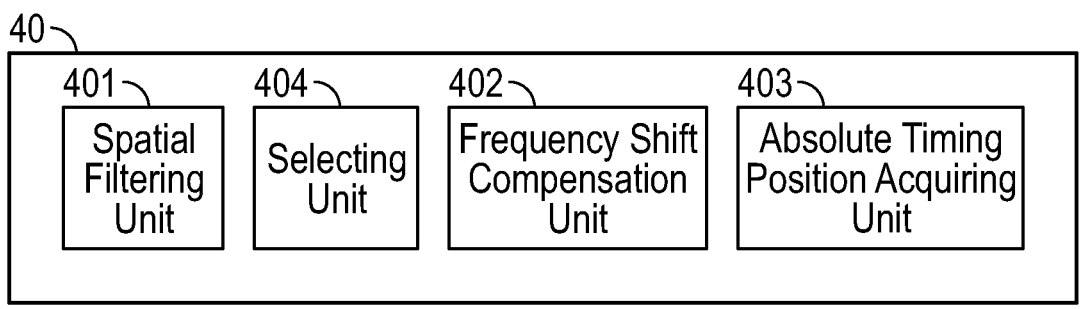
FIG. 6 shows a block diagram of another exemplary structure of the processing circuitry 40 of the signal processing device 4 according to an embodiment of the present disclosure.

FIG. 6 shows a block diagram of another exemplary structure of the processing circuitry 40 of the signal processing device 4 according to an embodiment of the present disclosure.

As shown in FIG. 6, in addition to the spatial filtering unit 401, the frequency shift compensation unit 402 and the absolute timing position acquiring unit 403 shown in FIG. 5, the processing circuitry 40 further includes: a selecting unit 404. The selecting unit 404 is configured to calculate a power of each of the plurality of synchronization sequence signals having subjected to the spatial filtering; and select n synchronization sequence signals having the first n largest powers, so as to perform frequency shift pre-compensation on the selected synchronization sequence signals, where n is an integer larger than or equal to 2.

According to the present disclosure, the selecting unit 404 may calculate the power of the synchronization sequence signal having subjected to the spatial filtering by adopting any method which is well known in the conventional technology, and the detailed calculation is not described in detail herein.

In this case, the frequency shift compensation unit 402 may perform frequency shift pre-compensation on only the selected n subspace signals having subjected to the spatial filtering which have the first n largest powers. According to the preferred embodiment of the present disclosure, the selecting unit 404 may select, for example, the two synchronization sequence signals having subjected to the spatial filtering which have the first two largest powers.

Hereinafter, as an example, in a case where two synchronization sequence signals having subjected to the spatial filtering which have the first two largest powers are selected, the frequency shift pre-compensation performed by the frequency shift compensation unit 402 and the determining of the absolute timing synchronization positions performed by the absolute timing position acquiring unit 403 are described. Those skilled in the art can understand that, in a case that a plurality of sub-space signals having subjected to the spatial filtering which have the largest power are selected to be processed, any two of these sub-space signals may be grouped into one group. Then, in a manner similar to that described below, the sub-space signals are processed, so as to acquire an absolute timing synchronization position of each of the sub-space signals.

The frequency shift compensation unit 402 performs the Doppler frequency shift pre-compensation and/or the carrier frequency shift pre-compensation on the selected two sub-space signals $K_1$ and $K_2$ having subjected to the spatial filtering which have the first two largest powers.

According to the present disclosure, the frequency shift compensation unit 402 may calculate to acquire a Doppler frequency shift pre-compensation parameter based on coefficients of spatial filters corresponding to the selected two synchronization sequence signals having the first two largest powers, so as to perform the Doppler frequency shift pre-compensation on each of the two synchronization sequence signals based on the coefficients of the spatial filters.

For example, the frequency shift compensation unit 402 may determine the Doppler frequency shift pre-compensation parameter S based on the coefficients of the $K_1$-th filter and the $K_2$-th filter corresponding to the signals having subjected to the spatial filtering which have the first two largest powers, for example, according to the following formula (10).

$$s = e^{\frac{-j2\pi n T_s v}{\lambda}[cos(\theta_{ki} - \theta_R)]} \quad (10)$$

where $\theta_R$ represents a motion direction angle, $\theta_{k_i}$ represents a direction angle corresponding to the $k_i$-th spatial filter, $\lambda$ represents a carrier wavelength, v represents a relative movement speed between the receiver and the transmitter, n represents a discrete time value for sampling, and $T_s$ represents the symbol period.

In such a case, the frequency shift compensation unit 402 may perform Doppler frequency shift pre-compensation on the synchronization sequence signals having subjected to the spatial filtering by using the coefficients of spatial filters, so as to suppress interference on the received synchronization sequence signals due to the Doppler frequency shift without any prior information, that is, without performing any processing on the synchronization sequence signals.

Based on the principle that the synchronization sequence signals having subjected to the spatial filtering are subject to approximately the same interference from the carrier frequency shift, the frequency shift compensation unit 402 may perform sliding conjugate multiplication on two synchronization sequence signals having subjected to the spatial filtering, to eliminate interference on the received signals due to the carrier frequency shift. For example, formula (11) is used for acquiring a signal C(n,m) which is obtained after carrier frequency shift pre-compensation is performed on two signals $k_1$ and $k_2$ subjected to the spatial filtering and subjected to the Doppler frequency shift pre-compensation, and interference on the received signals due to the carrier frequency shift is thus eliminated.

$$C(n, m) = e^{\frac{-j2\pi n T_s v}{\lambda}[cos(\theta_{k_1} - \theta_R) - cos(\theta_{k_2} - \theta_R)]} y_{k_1}^a(n) y_{k_2}^{a*}(n-m) \quad (11)$$

where $y_{k_1}^a(n)$ represents the $k_1$-th signal having subjected to the spatial filtering, $y_{k_2}^{a*}(n-m)$ represents the conjugation of a cyclic shift sequence obtained after performing a cyclic shift by m bits on the $k_2$-th signal having subjected to the spatial filtering, $\theta_R$ represents a motion direction angle, $\theta_{k_j}$ represents a direction angle corresponding to the $k_i$-th spatial filter, $\lambda$ represents a carrier wavelength, v represents a relative movement speed between the receiver and the transmitter, n represents a discrete time value for sampling, and $T_s$ represents the symbol period.

The absolute timing position acquiring unit 403 estimates the timing synchronization parameter based on the synchronization sequence signals having subjected to the frequency shift pre-compensation performed by the frequency shift compensation unit 402.

Figure 7:
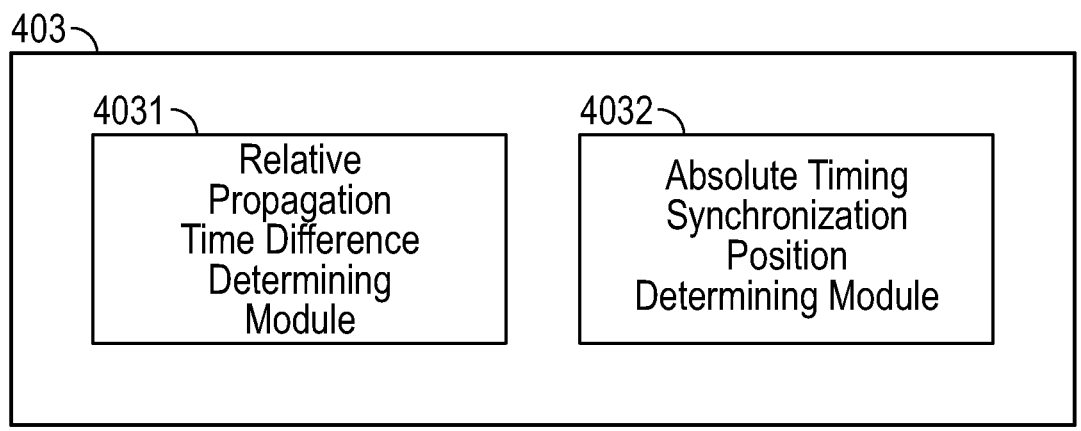
FIG. 7 shows a block diagram of an exemplary structure of an absolute timing position acquiring unit 403 according to an embodiment of the present disclosure.

FIG. 7 shows a block diagram of an exemplary structure of the absolute timing position acquiring unit 403 according to an embodiment of the present disclosure.

As shown in FIG. 7, the absolute timing position acquiring unit 403 includes: a relative propagation time difference determining module 4031 and an absolute timing synchronization position determining module 4032. The relative propagation time difference determining module 4031 is configured to estimate, in a case that the carrier frequency shift pre-compensation is performed on the synchronization sequence signals having subjected to the spatial filtering, a relative propagation time difference between the first two synchronization sequence signals based on the synchronization sequence signals having subjected to the carrier frequency shift pre-compensation. The absolute timing synchronization position determining module 4032 is configured to determine the absolute timing synchronization positions of the two synchronization sequence signals based on the relative propagation time difference and the second sub-sequences of the two synchronization sequence signals.

According to the present disclosure, the relative propagation time difference determining module 4031 may estimate the relative propagation time difference $m_{TOA}$ between the two signals $K_1$ and $K_2$ based on the signals obtained after the carrier frequency shift pre-compensation (that is, synchronization sequence signals having subjected to the sliding conjugate multiplication). For example, the relative propagation time difference determining module 4031 may estimate the parameter of the relative propagation time delay difference by using the maximum of the absolute values of the sums acquired by summing the signals having subjected to the sliding conjugate multiplication (that is, the signals having subjected to the carrier frequency shift pre-compensation) in a range of one frame.

For example, the relative propagation time difference $m_{TOA}$ may be acquired by using the following formula (12):

$$m_{TOA} = \underset{0 \leq m \leq W}{\arg\max} \left| \sum_{n=n_0}^{n_0+M} C(n, m) \right| \quad (12)$$

where $n_0$ represents an initial sampling time instant. M represents a sampling length of the signal in one frame, and W represents a length of a search window for estimating the relative propagation time difference and is relevant to the maximum geographical distance $d_{max}$ between adjacent wireless communication apparatuses that transmit synchronization sequence signals. Generally, the length W of the search window is not greater than the acquired cyclic shift value calculated by using the above formula (1).

Since the first sub-sequence of the received synchronization sequence signal has a good auto-correlation and there is a good cross-correlation between the first sub-sequence and the second sub-sequence of the received synchronization sequence signal, the relative propagation time difference $m_{TOA}$ can be accurately acquired by searching the correlation peak, for example, based on the above formula (12).

Figure 8:
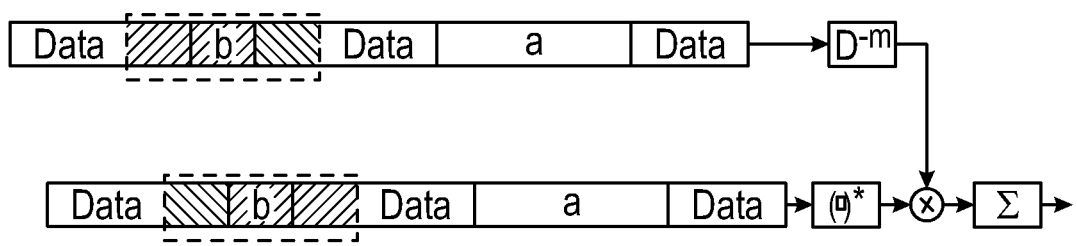
FIG. 8 shows a schematic diagram of processing performed by a relative propagation time difference determining module 4031 according to an embodiment of the present disclosure.

FIG. 8 shows a schematic diagram of processing performed by a relative propagation time difference determining module 4031 according to an embodiment of the present disclosure.

As shown in FIG. 8, sliding conjugate multiplication is performed on two different synchronization sequence signals, and the parameter of the relative propagation time delay difference $m_{TOA}$ is estimated by using the maximum of the absolute values of the sums acquired by summing the signals having subjected to the sliding conjugate multiplication in a range of one frame. As shown in FIG. 8, the received two synchronization sequence signals have the same first sub-sequences {a} and the second sub-sequences {b} which are different from each other but have the cyclic shift relationship with each other.

After the relative propagation time difference $m_{TOA}$ is acquired, the absolute timing synchronization position determining module 4032 may determine the absolute timing synchronization positions of the two synchronization sequence signals based on the relative propagation time difference and the second sub-sequences of the synchronization sequence signals.

Specifically, the absolute timing synchronization position determining module 4032 aligns the received two signals having subjected to the spatial filtering in time and then performs conjugate multiplication on the aligned signals to acquire a conjugate multiplication signal $C(n, m_{TOA})$, so as to estimate the absolute timing synchronization position parameter $m_{Syn}$ by using the conjugate multiplication signal. For example, the absolute timing synchronization position parameter $m_{Syn}$ may be estimated by performing a cross-correlation operation on the conjugate multiplication signal $C(n, m_{TOA})$ which is acquired by performing the conjugate multiplication on the two signals having subjected to the spatial filtering and aligned in time, and a cyclic shift sequence of the second sub-sequence. For example, the absolute timing synchronization position determining module 4032 may estimate the absolute timing synchronization position parameter $m_{Syn}$ by using the following formula (13):

$$m_{Syn} = \arg\max_{0 \le m \le M} \left| \sum_{m=0}^{N-1} C(n, m_{TOA}) q(n-m) \right| \quad (13)$$

where q(n–m) represents the cyclic shift sequence of the second sub-sequences {$b_i$} of the synchronization sequence signals. Since the second sub-sequences {$b_i$} satisfy the shift-and-add property, q(n) may be acquired by performing offline calculation based on the following formula (14):

$$\{q_i\} = \{b_i\} \oplus \{b_{i+\tau_{cs}}\} \quad (14)$$

where the sequence {$b_{i+\tau_{cs}}$} represents the cyclic shift sequence of the second sub-sequence {$b_i$}, and $\tau_{cs}$ represents the cyclic shift value.

Since the second sub-sequences of the received synchronization sequence signals have the good auto-correlation and the good cyclic shift property, the absolute timing synchronization position can be accurately acquired by searching the correlation peak, for example, based on the above formula (13).

Figure 9:
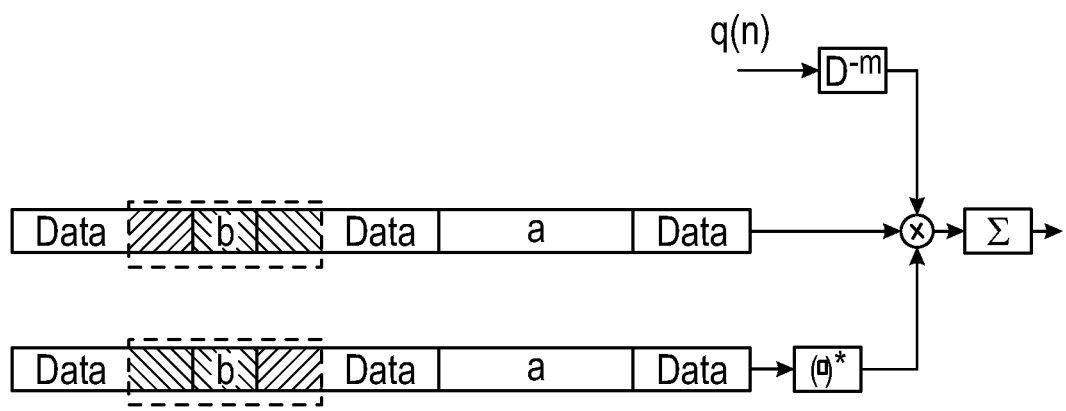
FIG. 9 shows a schematic diagram of processing performed by an absolute timing synchronization position determining module 4032 according to an embodiment of the present disclosure.

FIG. 9 shows a schematic diagram of processing performed by an absolute timing synchronization position determining module 4032 according to an embodiment of the present disclosure.

As shown in FIG. 9, after a frame head of the synchronization sequence signal $K_1$ and a frame head of the synchronization sequence signal $K_2$ are aligned by using the acquired relative propagation time difference $m_{TOA}$, the conjugate multiplication is performed on the two synchronization sequence signals of which the frame heads are aligned, and the cross-correlation operation is performed on the signals having subjected to the conjugate multiplication to determine the absolute timing synchronization position of the synchronization sequence signal $K_2$ by using the above formula (13).

After the respective absolute timing synchronization positions of the synchronization sequence signals are acquired, the mobile terminal decodes the signals transmitted from wireless communication apparatuses based on the absolute timing synchronization positions, that is, the normal reception of the signal is achieved.

A case is described above that the frequency shift compensation unit 402 performs both the Doppler frequency shift pre-compensation and the carrier frequency shift pre-compensation on the synchronization sequence signals having subjected to the spatial filtering. However, the present disclosure is not limited to the case. Those skilled in the art should understand that the frequency shift compensation unit 402 may be configured to perform, based on practical application conditions, only the Doppler frequency shift pre-compensation or only the carrier frequency shift pre-compensation on the synchronization sequence signals having subjected to the spatial filtering.

For example, in a case that only the Doppler frequency shift pre-compensation is performed on the synchronization sequence signals without performing the carrier frequency shift pre-compensation, the Doppler frequency shift pre-compensation is performed on the synchronization sequence signals to acquire the synchronization sequence signals having subjected to the Doppler frequency shift pre-compensation p(n) by using the following formula (15):

$$p(n) = e^{\frac{-j2\pi n T_s v}{\lambda}[\cos(\theta_{k_1} - \theta_R)]} y_{k_1}^a(n) \quad (15)$$

where $y_{k_1}^a(n)$ represents the $k_1$-th signal having subjected to the spatial filtering, $\theta_R$ represents the motion direction angle, $\theta_{k_1}$ represents the direction angle corresponding to the $k_1$-th spatial filter, $\lambda$ represents the carrier wavelength, v represents the relative movement speed between the receiver and the transmitter, n represents a discrete time value for sampling, and $T_s$ represents the symbol period.

The timing synchronization position of the synchronization sequence signal $y_{k_1}^a(n)$ is estimated by searching the correlation peak of the auto-correlation:

$$m_{Syn} = \arg\max_{0 \le m \le M} \left| \sum_{m=0}^{N-1} p(n) q(n-m) \right|$$

where q(n–m) represents the cyclic shift sequence of the second sub-sequence {$b_i$} of the synchronization sequence signal similar to that shown in formula (13).

In a case that only the carrier frequency shift pre-compensation is performed on the synchronization sequence signals without performing the Doppler frequency shift pre-compensation, the conjugate multiplication is performed on the selected two synchronization sequence signals having subjected to the spatial filtering and the absolute timing position acquiring unit 403 performs the processing similar to that describe with respect to FIGS. 7 to 9, so as to determine the absolute timing synchronization positions of the synchronization sequence signals.

Since the synchronization sequence signals transmitted from the plurality of wireless communication apparatuses are different from each other, the mobile terminal receiving the synchronization sequence signals can suppress and eliminate interference on acquiring absolute timing synchronization positions due to the Doppler frequency shift and the large carrier frequency shift, in acquiring the absolute timing synchronization positions of the synchronization sequence signals.

Figure 10:
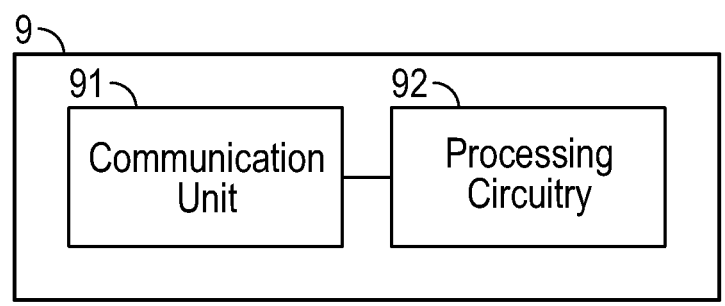
FIG. 10 shows a schematic diagram of a mobile terminal according to an embodiment of the present disclosure.

FIG. 10 shows a schematic diagram of a mobile terminal according to an embodiment of the present disclosure. As shown in FIG. 10, a mobile terminal 9 includes: a communication unit 91 and processing circuitry 92. The communication unit 91 is configured to receive a plurality of synchronization sequence signals which are different from each other and transmitted from a plurality of wireless communication apparatuses. The processing circuitry 92 is configured to perform frequency shift pre-compensation on the plurality of synchronization sequence signals to acquire an absolute timing synchronization positions of the plurality of synchronization sequence signals, so that the mobile terminal receives signals from the wireless communication apparatuses based on the absolute timing synchronization positions.

According to the embodiment of the present disclosure, the communication unit 91 of the mobile terminal receives synchronization sequence signals which are different from each other and transmitted from a plurality of wireless communication apparatuses, and processes the received synchronization sequence signals, to acquire the absolute timing synchronization positions of the plurality of synchronization sequence signals.

According to the embodiment of the present disclosure, a plurality of wireless communication apparatuses transmitting synchronization sequence signals which are different with each other may be the plurality of wireless communication apparatuses described in the above embodiment of the present disclosure, and the transmitted synchronization sequence signals may be the synchronization sequence signals which are configured by the synchronization sequence configuring unit of the control device described with reference to FIGS. 1 to 3 according to the above embodiment of the present disclosure. Therefore, detailed description of the synchronization sequence signals received by the communication unit 91 is omitted herein.

In addition, operations performed by the processing circuitry 92 on the received synchronization sequence signals which are different with each other are similar to operations performed by the processing circuitry 40 of the signal processing device 4 described with reference to FIGS. 4 to 9 according to the embodiment of the present disclosure, and the detail description is omitted herein.

The first sub-sequence and the second sub-sequence of each of the synchronization sequence signals according to the present disclosure may be used in conjunction with the PSS and the SSS included in the existing LTE standard respectively. The first sub-sequence and the second sub-sequence of the synchronization sequence signal according to the present disclosure may be implemented by replacing the first sub-sequence with the PSS and adding the second sub-sequence in other time slots of a signal frame in a case that the PSS and the SSS in the existing LTE standard maintain unchanged. Alternatively, the first sub-sequence and the second sub-sequence according to the present disclosure may be implemented by adding the first sub-sequence and the second sub-sequence in other time slots of the signal frame.

Figure 11:
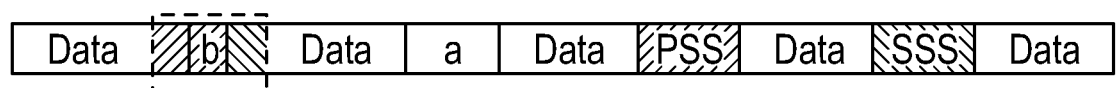
FIG. 11 shows a schematic diagram of a synchronization sequence signal used in conjunction with a PSS and an SSS which are included in the existing LTE standard according to an embodiment of the present disclosure.

FIG. 11 shows a schematic diagram of a synchronization sequence signal according to an embodiment of the present disclosure which is used in conjunction with a PSS and an SSS included in the existing LTE standard. The synchronization sequence signal including the first sub-sequence and the second sub-sequence according to the present disclosure is implemented by adding the first sub-sequence {a} and the second sub-sequence {b} in other time slots of the signal frame, in a case that the PSS and the SSS in the existing LTE standard maintain unchanged.

Therefore, the synchronization sequence signals according to the present disclosure can support the higher moving speed and the higher carrier frequency without modifying the design of the synchronization sequence.

FIG. 11 shows a schematic diagram of a synchronization sequence signal according to an embodiment of the present disclosure which is used in conjunction with a PSS and an SSS included in the existing LTE standard.

Corresponding to the control device for a wireless communication apparatus and the signal processing device for a mobile terminal according to the present disclosure, a control method for a wireless communication apparatus and a signal processing method for a mobile terminal are further provided according to the present disclosure. Hereinafter, summaries of the methods are provided without repeating some details illustrated above. It should be noted that, although those methods are disclosed in the process of describing the control device for a wireless communication apparatus and the signal processing device for a mobile terminal, those components may not be adopted in performing the methods, or the methods may not be implemented by those components. For example, embodiments of the control device for a wireless communication apparatus and the signal processing device for a mobile terminal may be partly or fully implemented by hardware and/or firmware. Methods illustrated hereinafter may be completely implemented by computer-executable programs, although the hardware and/or the firmware of the control device for a wireless communication apparatus and the signal processing device for a mobile terminal may be adopted in performing the methods.

Figure 12:
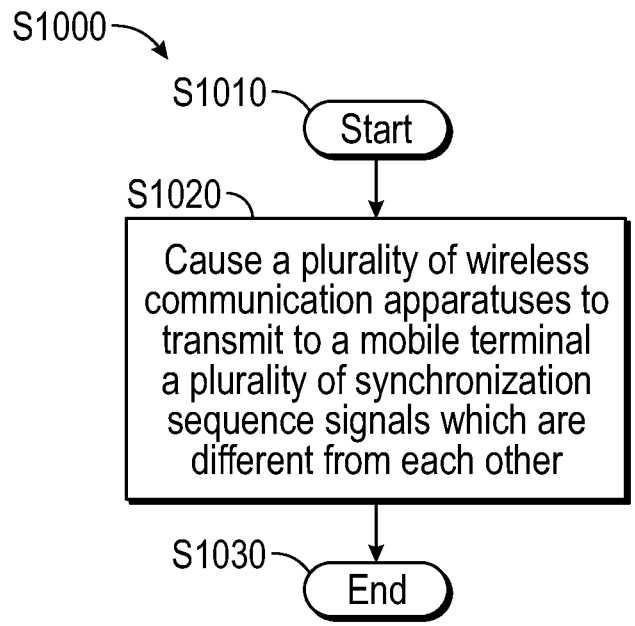
FIG. 12 shows a flowchart of a control method for a wireless communication apparatus according to an embodiment of the present disclosure.

FIG. 12 shows a flowchart of a control method for a wireless communication apparatus according to an embodiment of the present disclosure.

As shown in FIG. 12, a processing flow S1000 of the control method according to the embodiment of the present disclosure starts from S1010, and then proceeds to S1020.

In S1020, a plurality of wireless communication apparatuses are caused to transmit a plurality of synchronization sequence signals which are different from each other to a mobile terminal. For example, this can be implemented by the processing of the control unit 101 described above with reference to FIG. 1, and the description is omitted herein. Then the method proceeds to S1030.

The processing flow S1000 ends at S1030.

In the control method according to the present disclosure, the wireless communication apparatuses may be base stations, road side units (RSUs) or the like. With the control method according to the present disclosure, different wireless communication apparatuses (for example, base stations and RSUs) in the same logic cell can be controlled to transmit synchronization sequence signals which are different with each other.

The control method according to the present disclosure further includes: configuring each of the synchronization sequence signals to include a first sub-sequence and a second sub-sequence, where the first sub-sequences of the respective synchronization sequence signals are the same, and the second sub-sequences of the respective synchronization sequence signals are cyclic shift sequences which are different from each other, thereby controlling the plurality of wireless communication apparatuses to transmit the different synchronization sequence signals each of which is configured to include the first sub-sequence and the second sub-sequence.

In the control method according to the present disclosure, the first sub-sequence is used to estimate the relative propagation time delay difference between the synchronization sequence signals corresponding to the synchronization sequence signals in the receiver end. The second sub-sequence is used to estimate the absolute timing synchronization positions of the synchronization sequence signals after the mobile terminal receives the synchronization sequence signals.

In the control method according to the present disclosure, the cyclic shift values between the second sub-sequences of the synchronization sequence signals transmitted from the wireless communication apparatuses may be preferably calculated based on the maximum geographical distance between adjacent wireless communication apparatuses.

In the control method according to the present disclosure, the first sub-sequence and the second sub-sequence satisfy the following conditions:

(i) an auto-correlation value indicating auto-correlation of each of the first sub-sequence and the second sub-sequence is lower than a first predetermined threshold;

(ii) a cross-correlation value indicating cross-correlation between the first sub-sequence and the second sub-sequence is lower than a second predetermined threshold; and (iii) the second sub-sequence has a shift-and-add property.

According to the preferred embodiment of the present disclosure, the auto-correlation value of the first sub-sequence and/or the second sub-sequence goes to zero, and/or the cross-correlation value between the first sub-sequence and the second sub-sequence goes to zero. Preferably, the second sub-sequence may be the maximum periodic linear shift register sequence.

Figure 13:
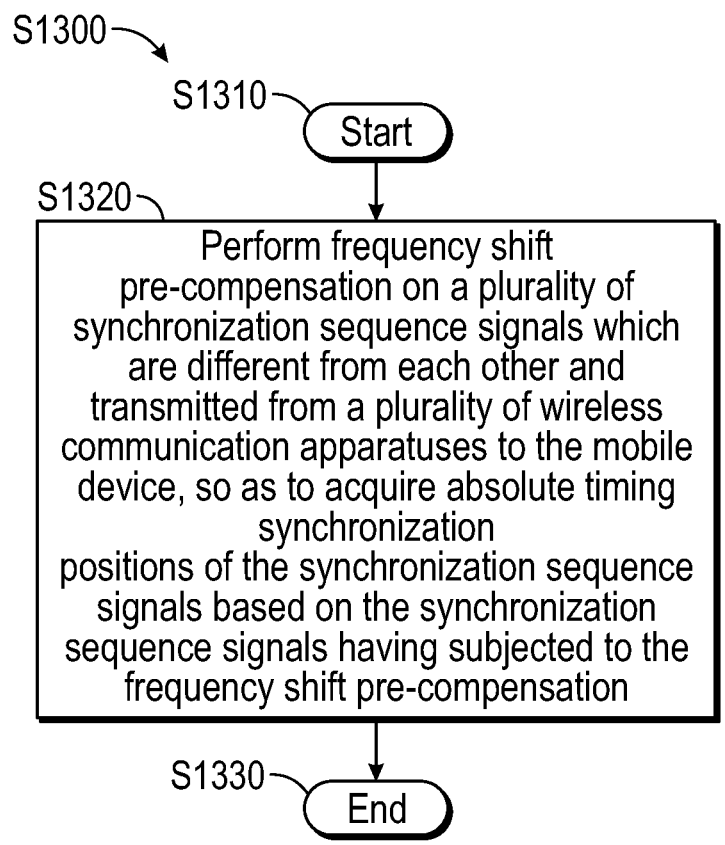
FIG. 13 shows a flowchart of a control method for a wireless communication apparatus according to an embodiment of the present disclosure.

FIG. 13 shows a flowchart of a control method for a wireless communication apparatus according to an embodiment of the present disclosure.

As shown in FIG. 13, a processing flow S1300 of the control method according to the embodiment of the present disclosure starts from S1310, and then proceeds to S1320.

In S1320, frequency shift pre-compensation is performed on the plurality of synchronization sequence signals which are different from each other and transmitted from a plurality of wireless communication apparatuses to the mobile terminal, to acquire the absolute timing synchronization positions of the synchronization sequence signals based on the synchronization sequence signals having subjected to the frequency shift pre-compensation, so that the mobile terminal receives signals from the wireless communication apparatuses based on the absolute timing synchronization positions. For example, this can be implemented by the processing of the processing circuitry 40 described above with reference to FIG. 4, and the description is omitted herein. Then the method proceeds to S1330.

The processing flow S1300 ends at S1330.

The signal processing method for a mobile terminal according to the embodiment of the present disclosure further includes: performing the spatial filtering on the received plurality of synchronization sequence signals; and performing the Doppler frequency shift pre-compensation and/or the carrier frequency shift pre-compensation on each of the synchronization sequence signals having subjected to the spatial filtering, so as to determine the absolute tinting synchronization positions of the synchronization sequence signals based on the synchronization sequence signals having subjected to the frequency shift pre-compensation.

The signal processing method for a mobile terminal according to the embodiment of the present disclosure further includes: calculating a power of each of the plurality of synchronization sequence signals having subjected to the spatial filtering; and selecting n synchronization sequence signals having the first n largest powers, so as to perform the Doppler frequency shift pre-compensation and/or the carrier frequency shift pre-compensation on the selected synchronization sequence signals, where n is an integer larger than or equal to 2. According to the present disclosure, the process of performing the Doppler frequency shift pre-compensation on each of the synchronization sequence signals having subjected to the spatial filtering includes: performing the Doppler frequency shift pre-compensation on each of the n synchronization sequence signals based on the coefficients of the spatial filters performing the spatial filtering.

In the signal processing method for a mobile terminal according to the present disclosure, each of the plurality of synchronization sequence signals includes the first sub-sequence and the second sub-sequence, where the first sub-sequences of the synchronization sequence signals are the same, and the second sub-sequences of the synchronization sequence signals are cyclic shift sequences which are different from each other.

In the signal processing method for a mobile terminal according to the present disclosure, in a case that n is equal to 2, the process of acquiring the absolute timing synchronization positions of the plurality of synchronization sequence signals based on the synchronization sequence signals having subjected to the frequency shift pre-compensation includes: estimating, in a case that the carrier frequency shift pre-compensation is performed on the synchronization sequence signals having subjected to the spatial filtering, relative propagation time difference between the two synchronization sequence signals based on the synchronization sequence signals having subjected to the carrier frequency shift pre-compensation; and determining the absolute timing synchronization positions of the two synchronization sequence signals based on the relative propagation time difference and the second sub-sequences of the synchronization sequence signals.

Figure 14:
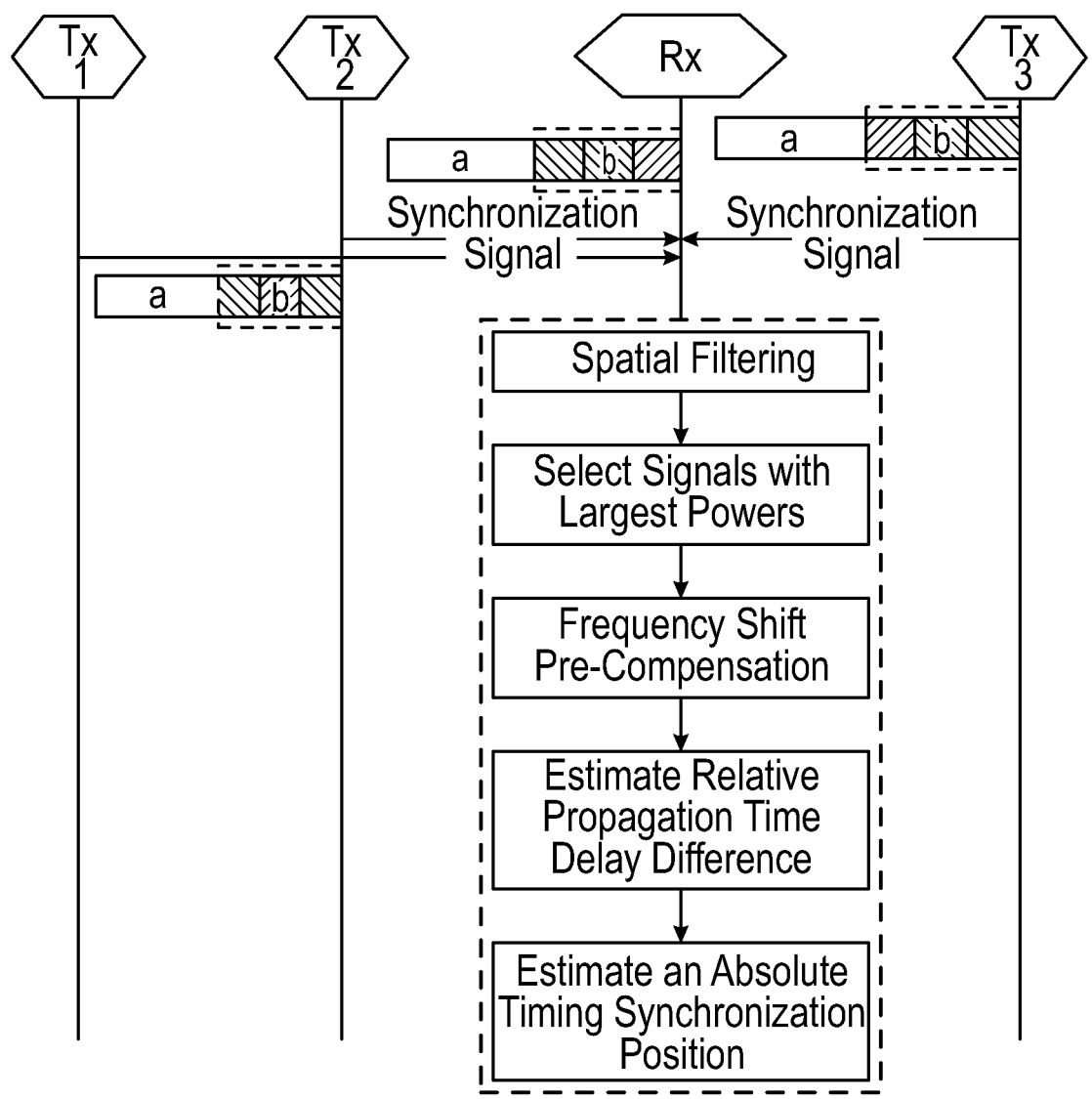
FIG. 14 shows a block diagram of a wireless communication system according to an embodiment of the present disclosure.

According to an embodiment of the present disclosure, a wireless communication system is further provided. FIG. 14 shows a block diagram of the wireless communication system.

Referring to FIG. 14, the wireless communication system 14 includes a plurality of wireless communication apparatuses Tx1 to Tx3 and a mobile terminal Rx. According to the present disclosure, the wireless communication apparatuses Tx1 to Tx3 are different wireless communication apparatuses (for example, base stations or RSUs) in one logic cell. As shown in FIG. 14, the plurality of wireless communication apparatuses are configured to transmit synchronization sequence signals which are different with each other to the mobile terminal.

As shown in FIG. 14, first sub-sequences $\{a_i\}$ of the synchronization sequence signals transmitted from the respective wireless communication apparatuses Tx1, Tx2 and Tx3 are the same, and second sub-sequences $\{b_i\}$ of the synchronization sequence signals transmitted from the respective wireless communication apparatuses Tx1, Tx2 and Tx3 have the cyclic shift relationship with each other.

The wireless communication apparatuses Tx1, Tx2 and Tx3 may be controlled by the control device for a wireless communication apparatus described with reference to FIGS. 1 to 3, to transmit synchronization sequence signals which are different with each other to the mobile terminal Rx. The control device may be provided in any one of the wireless communication apparatuses Tx1, Tx2 and Tx3, or may be a separate controller independent from the wireless communication apparatuses Tx1, Tx2 and Tx3 and configured to control the wireless communication apparatuses.

After receiving the synchronization sequence signals which are different from each other and transmitted from the wireless communication apparatuses Tx1, Tx2 and Tx3, the mobile terminal Rx performs signal processing including the frequency shift pre-compensation on the received synchronization sequence signals, to acquire absolute timing synchronization positions of the plurality of synchronization sequence signals, so that the mobile terminal receives signals from the wireless communication apparatuses based on the absolute timing synchronization positions.

Referring to FIG. 14, the mobile terminal may perform signal processing on the received synchronization sequence signals, including spatial filtering, synchronization sequence signal selecting, relative propagation time difference estimating and absolute timing synchronization position determining. The above signal processing methods may be performed with reference to the processing operations of the signal processing device shown in FIGS. 4 to 8, which are not described in detail herein.

Figure 15:
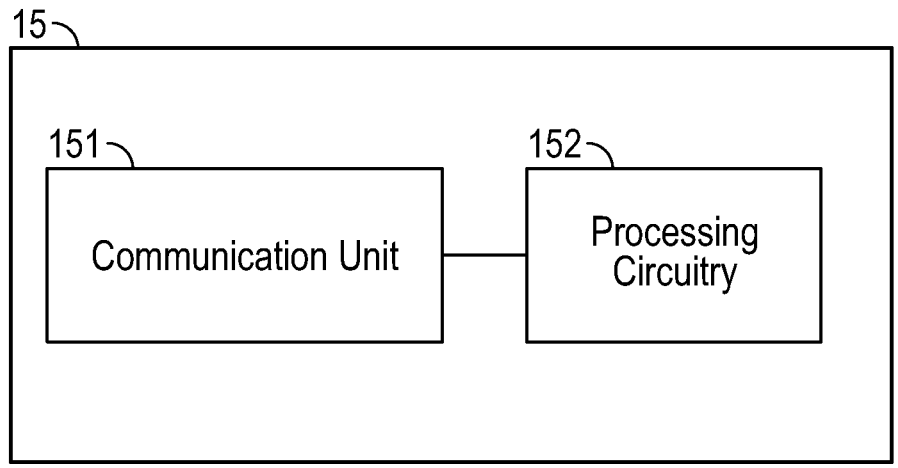
FIG. 15 shows a block diagram of a mobile terminal for a wireless communication system according to an embodiment of the present disclosure.

According to an embodiment of the present disclosure, a mobile terminal for a wireless communication system is further provided. FIG. 15 shows a block diagram of the mobile terminal for a wireless communication system.

As shown in FIG. 15, the mobile terminal 15 for a wireless communication system according to the embodiment of the present disclosure includes: a communication unit 151, and signal processing circuitry 152. The communication unit 151 is configured to receive communication messages transmitted from the plurality of wireless communication apparatuses, where each of the communication messages transmitted from the plurality of wireless communication apparatuses includes at least a first sub-sequence signal and a second sub-sequence signal. The signal processing circuitry 152 is configured to perform signal processing on the first sub-sequence signals and the second sub-sequence signals, so that the communication messages respectively transmitted from the plurality of wireless communication apparatuses are made in synchronization.

According to the embodiment of the present disclosure, the first sub-sequence signal is the primary synchronize signal (PSS), and the second sub-sequence signal is the secondary synchronize signal (SSS).

According to the embodiment of the present disclosure, the first sub-sequence signal and the second sub-sequence signal may be the first sub-sequence and the second sub-sequence of the synchronization sequence signal configured by the synchronization sequence configuring unit 102 of the control circuitry of the control device described above with reference to FIG. 2 according to the embodiment of the present disclosure. Specific structures and configurations of the first sub-sequence signal and the second sub-sequence signal are not described in detail herein.

In addition, a specific operation of the signal processing circuitry 152 is similar to the operation of the processing circuitry 40 of the signal processing device 4 described with reference to FIGS. 4 to 9 according to the embodiment of the present disclosure, and the detailed description is omitted herein.

Compared with the conventional technology, the control device and the control method for a wireless communication apparatus, the signal processing device and the signal processing method for a mobile terminal, the control apparatus, the mobile terminal and the wireless communication system according to embodiments of the present disclosure can achieve at least one of the following beneficial effects. Influences on the performance of a timing synchronization unit due to the large carrier frequency shift can be effectively suppressed and eliminated, such that the capability of the wireless communication system to resist the carrier frequency shift is improved; influences on the performance of a timing synchronization system due to the Doppler frequency shift can be suppressed, so that the capability of the system to estimate the timing synchronization parameter in a fast time-varying channel is improved; the timing synchronization parameter can be estimated without a prior information; and a higher moving speed and a higher carrier frequency can be supported without modifying the design of the synchronization sequence.

[Application Scenarios]

Figure 16:
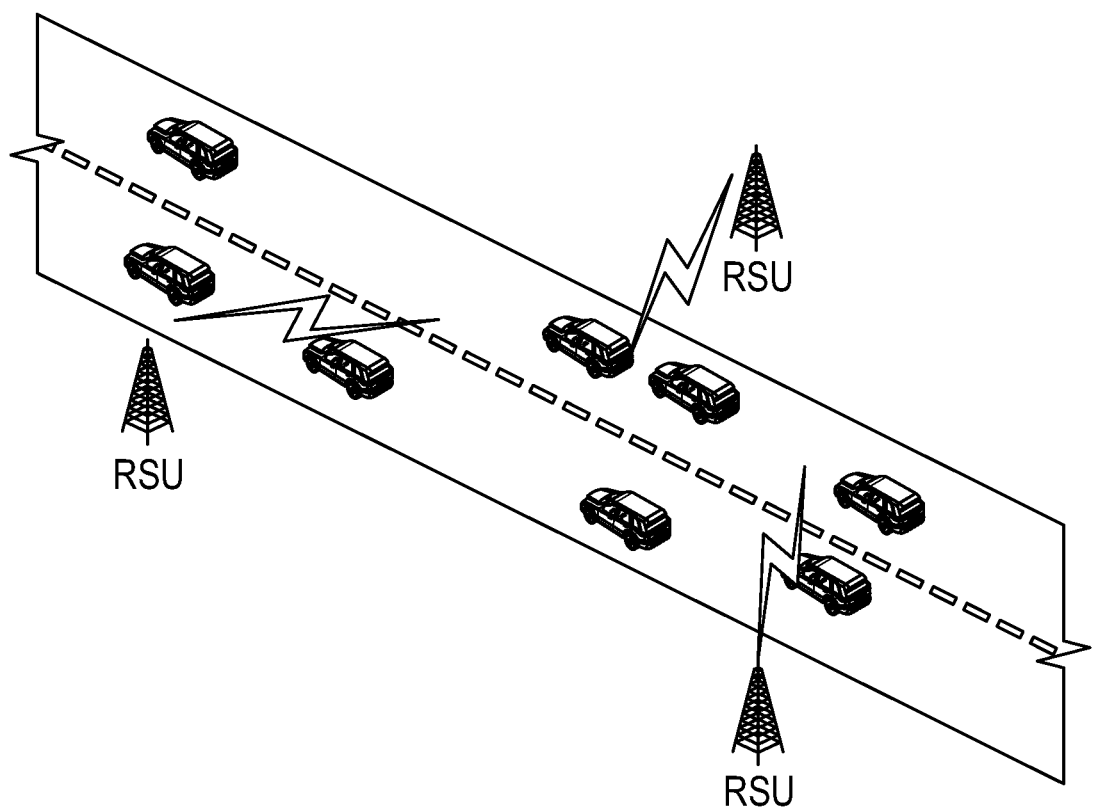
FIGS. 16, 17 and 18 respectively show application scenarios of V2N, V2V and a high-speed rail mobile communication network in the Internet of Vehicles.
Figure 17:
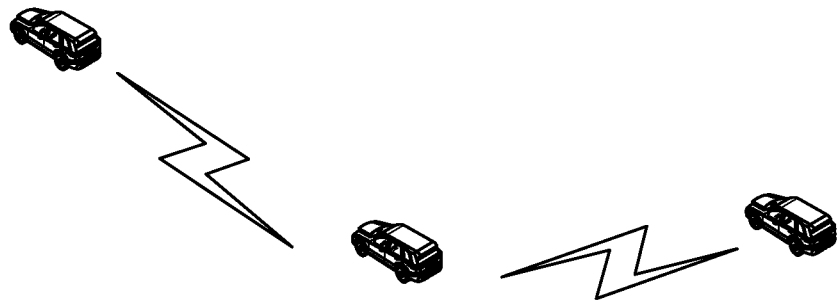
Figure 18:
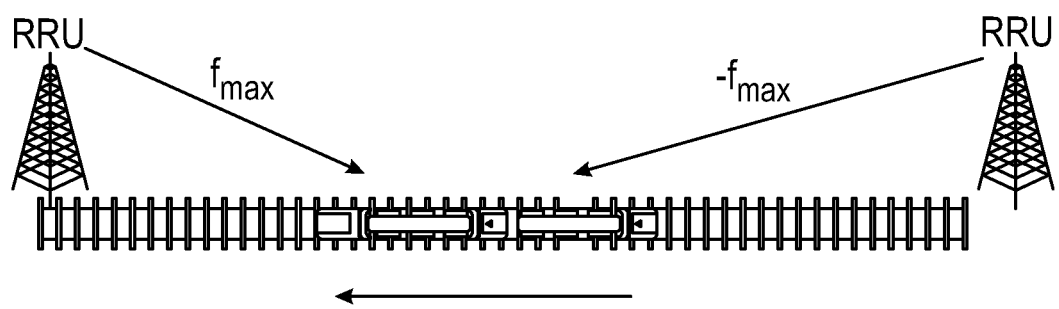

The present disclosure is mainly applied in high-speed mobile communication systems, including V2N, V2V and a high-speed rail mobile communication network in the Internet of Vehicles. FIGS. 16, 17 and 18 respectively show application scenarios of V2N, V2V and the high-speed rail mobile communication network in the Internet of Vehicles. In those application scenarios, a plurality of wireless communication apparatuses (base stations/remote radio frequency units/road side units/vehicles) located at different geographic locations transmit different a plurality of synchronization sequence signals according to the present disclosure, and the mobile terminal located in the receiver end suppresses the Doppler frequency shift and the carrier frequency shift by using the signal processing device provided in the present disclosure, such that a good performance of estimating timing synchronization parameter is acquired.

Application Example of a User Equipment

First Application Example

Figure 19:
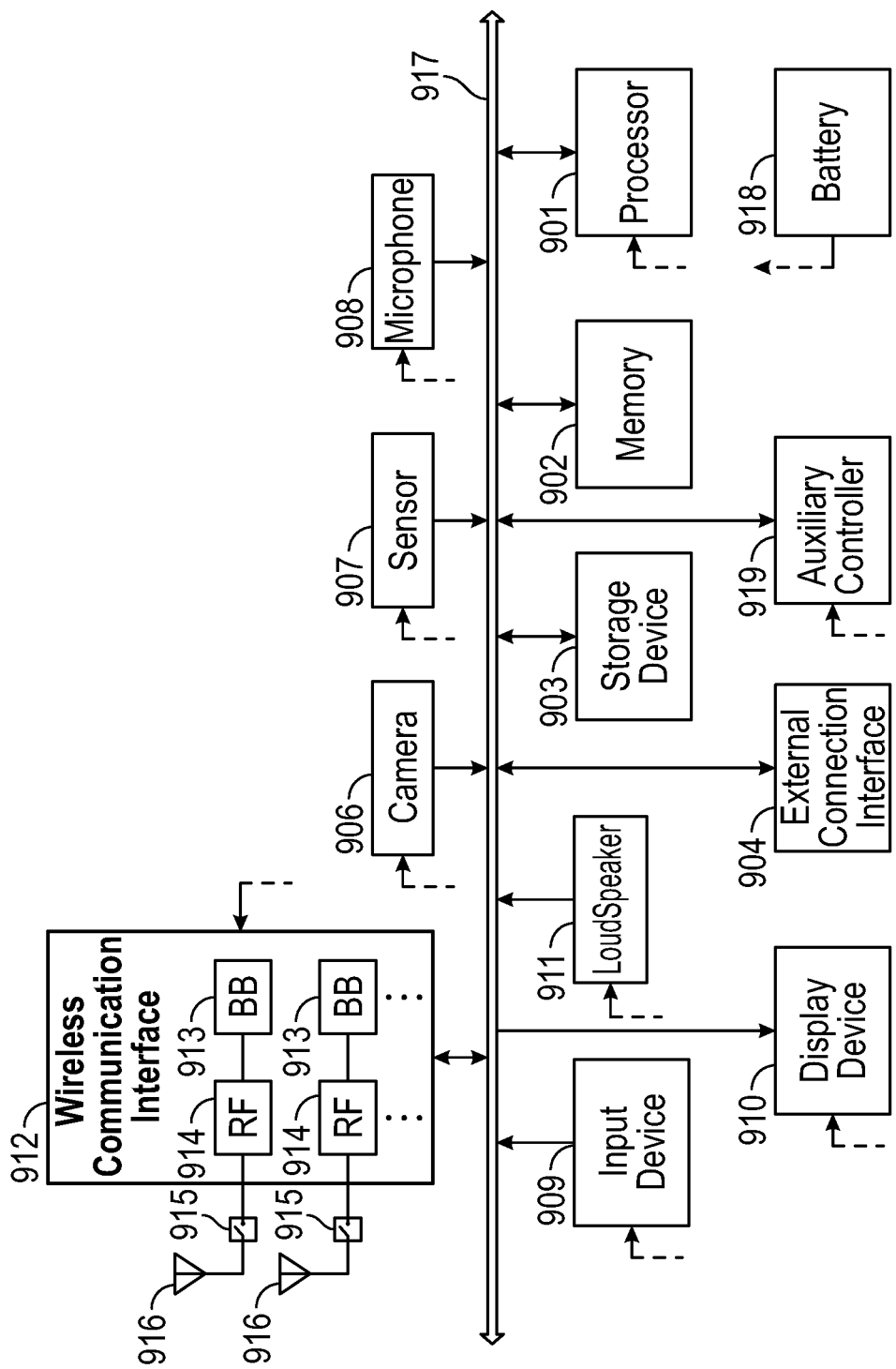
FIG. 19 shows a block diagram of an example of a schematic configuration of a smartphone to which the technology of the present disclosure may be applied.

FIG. 19 is a block diagram showing an example of a schematic configuration of a smart phone 900 to which the technology of the present disclosure may be applied. The smart phone 900 includes: a processor 901, a memory 902, a storage device 903, an external connection interface 904, a camera 906, a sensor 907, a microphone 908, an input device 909, a display device 910, a loudspeaker 911, a wireless communication interface 912, one or more antenna switches 915, one or more antennas 916, a bus 917, a battery 918 and an auxiliary controller 919.

The processor 901 may be, for example, a CPU or a system on a chip (SoC), and controls functions of an application layer and another layer of the smart phone 900.

The memory 902 includes RAM and ROM, and stores a program that is executed by the processor 901, and data. The storage device 903 may include a storage medium such as a semiconductor memory and a hard disk. The external connection interface 904 is an interface for connecting an external apparatus such as a memory card and a universal serial bus (USB) apparatus to the smart phone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are inputted to the smart phone 900 into audio signals. The input device 909 includes, for example, a touch sensor configured to detect touch onto a screen of the display device 910, a keypad, a keyboard, a button, or a switch, and receive an operation or information inputted from a user. The display device 910 includes a screen such as a liquid crystal display (LCD) and an organic light-emitting diode (OLED) display, and displays an output image of the smart phone 900. The loudspeaker 911 converts audio signals that are outputted from the smart phone 900 into sounds.

The wireless communication interface 912 supports any cellular communication scheme such as LTE and LTE-Advanced, and performs wireless communication. The wireless communication interface 912 may typically include, for example, a base band (BB) processor 913 and a radio frequency (RF) circuit 914. The BB processor 913 may perform, for example, encoding/decoding, modulating/demodulating, and multiplexing/demultiplexing, and performs various types of signal processing for wireless communication. In addition, the RF circuit 914 may include, for example, a mixer, a filter, and an amplifier, and transmits and receives radio signals via the antenna 916. The wireless communication interface 912 may be a chip module having the BB processor 913 and the RF circuit 914 integrated thereon. The wireless communication interface 912 may include multiple BB processors 913 and multiple RF circuits 914, as illustrated in FIG. 19. Although FIG. 19 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In this case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smart phone 900 may include the multiple antennas 916, as illustrated in FIG. 19. Although FIG. 19 illustrates the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage device 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smart phone 900 via feeder lines, which are partially shown as dashed lines in the figure. The auxiliary controller 919 operates a minimum necessary function of the smart phone 900, for example, in a sleep mode.

In the smart phone 900 shown in FIG. 19, the communication unit 91 described with reference to FIG. 9 may be implemented by the wireless communication interface 912. At least a part of the control function of the control device for a wireless communication apparatus and/or signal processing function of the signal processing device for a mobile terminal according to the present disclosure may be implemented by the processor 901 or the auxiliary controller 919.

Second Application Example

Figure 20:
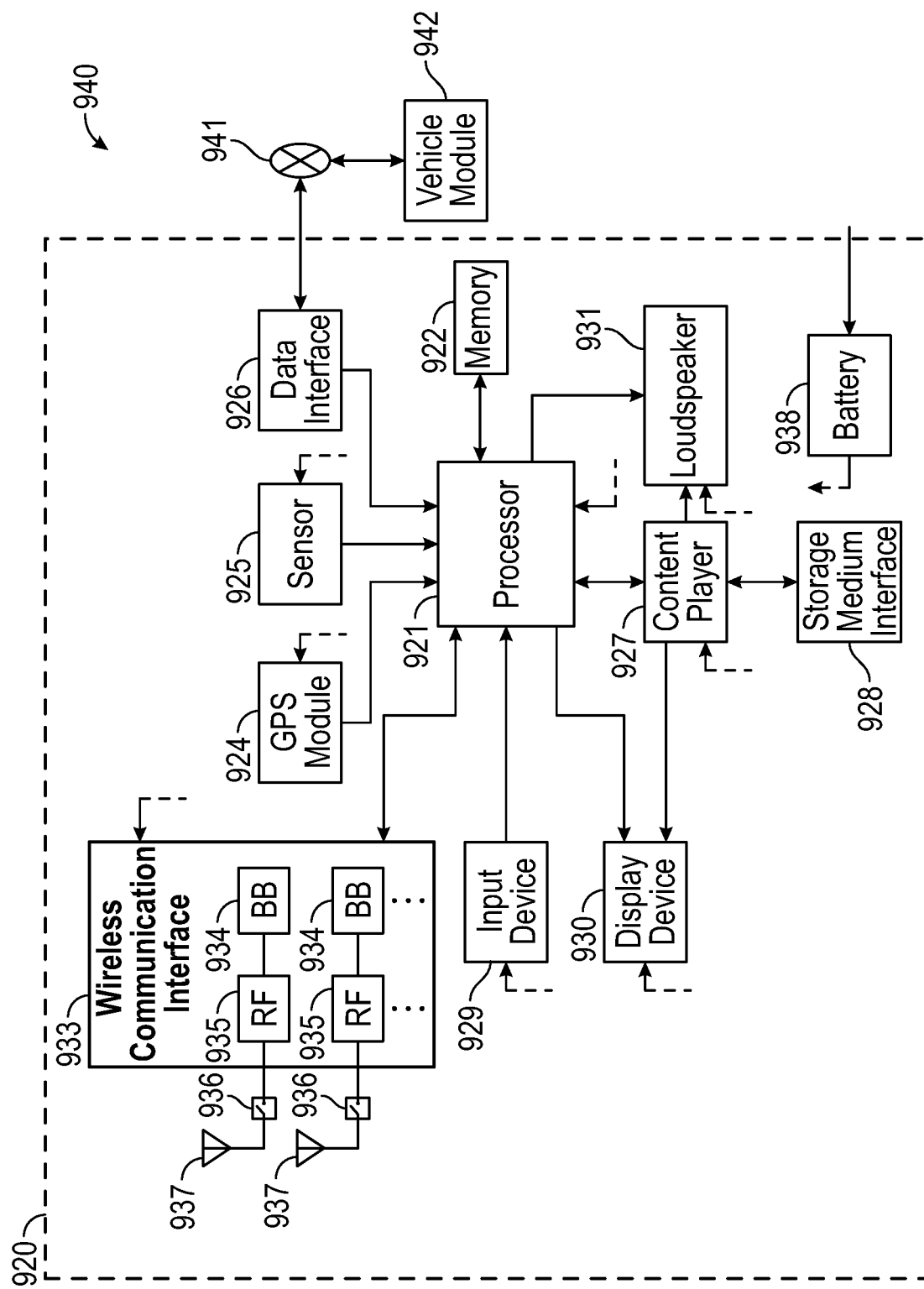
FIG. 20 shows a block diagram of an example of a schematic configuration of an automobile navigation device to which the technology of the present disclosure may be applied.

FIG. 20 is a block diagram showing an example of a schematic configuration of an automobile navigation device 920 to which the technology of the present disclosure may be applied. The automobile navigation device 920 includes a processor 921, a memory 922, a global positioning system (GPS) module 924, a sensor 925, a data interface 926, a content player 927, a storage medium interface 928, an input device 929, a display device 930, a loudspeaker 931, a wireless communication interface 933, one or more antenna switches 936, one or more antennas 937 and a battery 938.

The processor 921 may be a CPU or an SoC, and controls a navigation function and other functions of the automobile navigation device 920. The memory 922 includes an RAM and an ROM, and stores programs executed by the processor 921 and data.

The GPS module 924 measures a position of the automobile navigation device 920 (such as a latitude, a longitude and a height) by using a GPS signal received from a GPS satellite. The sensor 925 may include a set of sensors, such as a gyroscope sensor, a geomagnetic sensor and an air pressure sensor. The data interface 926 is connected to a vehicle network 941 for example through a terminal not shown, and acquires data generated by the vehicle (such as vehicle speed data).

The content player 927 reproduces contents stored in a storage medium (such as a CD and a DVD), and the storage medium is inserted into the storage medium interface 928. The input device 929 includes for example a touch sensor configured to detect touch on a screen of the display device 930, a button or a switch, and receives an operation or information inputted from a user. The display device 930 includes a screen of an LCD or OLED display for example, and displays an image with a navigation function or the reproduced content. The loudspeaker 931 outputs a sound with a navigation function or the reproduced content.

The wireless communication interface 933 supports any cellular communication scheme (such as LTE and LTE-advanced), and performs wireless communication. The wireless communication interface 933 may generally include a BB processor 934 and an RF circuit 935 for example. The BB processor 934 may perform encoding/decoding, modulating/demodulating and multiplexing/de-multiplexing, and perform various types of signal processing for wireless communication. In addition, the RF circuit 935 may include for example a mixer, a filter and an amplifier, and transmits and receives a wireless signal via the antenna 937. The wireless communication interface 933 may also be a chip module on which the BB processor 934 and the RF circuit 935 are integrated. As shown in FIG. 20, the wireless communication interface 933 may include multiple BB processors 934 and multiple RF circuits 935. Although FIG. 20 shows an example in which the wireless communication interface 933 includes multiple BB processors 934 and multiple RF circuits 935, the wireless communication interface 933 may include a single BB processor 934 or a single RF circuit 935.

In addition to the cellular communication scheme, the wireless communication interface 933 may support other types of wireless communication schemes, such as a short distance wireless communication scheme, a near field communication scheme and a wireless LAN scheme. In this case, for each type of wireless communication scheme, the wireless communication interface 933 may include the BB processor 934 and the RF circuit 935.

Each of the antenna switches 936 switches a connection destination of the antenna 937 between multiple circuits (such as circuits for different wireless communication schemes) included in the wireless communication interface 933.

Each of the antennas 937 includes a single or multiple antenna elements (such as multiple antenna elements included in the MIMO antenna), and is used for the wireless communication interface 933 to transmit and receive a wireless signal. As shown in FIG. 20, the automobile navigation device 920 may include multiple antennas 937. Although FIG. 16 shows an example in which the automobile navigation device 920 includes multiple antennas 937, the automobile navigation device 920 may include a single antenna 937.

In addition, the automobile navigation device 920 may include the antenna 937 for each type of wireless communication scheme. In this case, the antenna switches 936 may be omitted from the configuration of the automobile navigation device 920.

The battery 938 supplies power for blocks in the automobile navigation device 920 shown in FIG. 20 via a feeder line which is indicated partially as a dashed line in the figure. The battery 938 accumulates power provided by the vehicle.

In automobile navigation device 920 shown in FIG. 20, the communication unit described with reference to FIG. 9 may be implemented by the wireless communication interface 933. At least a part of the control function of the control device for a wireless communication apparatus and/or signal processing function of the signal processing device for a mobile terminal according to the present disclosure may be implemented by the processor 921.

The technology of the present disclosure may be implemented as a vehicle-mounted system (or a vehicle) 940 including one or more of the automobile navigation device 920, the vehicle network 941 and a vehicle module 942. The vehicle module 942 generates vehicle data (such as a vehicle speed, an engine speed and fault information), and outputs the generated data to the vehicle network 941.

The basic principles of the present disclosure are described above in conjunction with specific embodiments. However, it should be noted that, for those skilled in the art, it should be understood that all or any step or component of the method and device of the disclosure can be implemented in any computing apparatus (including processor, storage medium and so on) or a network of a computer apparatus in the form of hardware, firmware, software or a combination thereof, which can be achieved by those skilled in the art by using their basic circuit design knowledge or basic programming skills after reading the description of the present disclosure.

Furthermore, a program product storing machine-readable instruction codes is further provided according to the present disclosure. The instruction codes, when being read and executed by a machine, can perform the method according to the embodiment of the present disclosure.

Accordingly, a storage medium for carrying the above program product storing machine-readable instruction codes is further included in the present disclosure. The storage medium includes but is not limited to a floppy disk, an optical disc, a magneto-optical disk, a memory card, a memory stick or the like.

In a case that the present disclosure is implemented in software or firmware, a program constituting the software is installed from the storage medium or network to a computer with a dedicated hardware structure (e.g., a general-purpose computer 1800 illustrated in FIG. 21), which can perform various functions when various programs are installed thereon.

Figure 21:
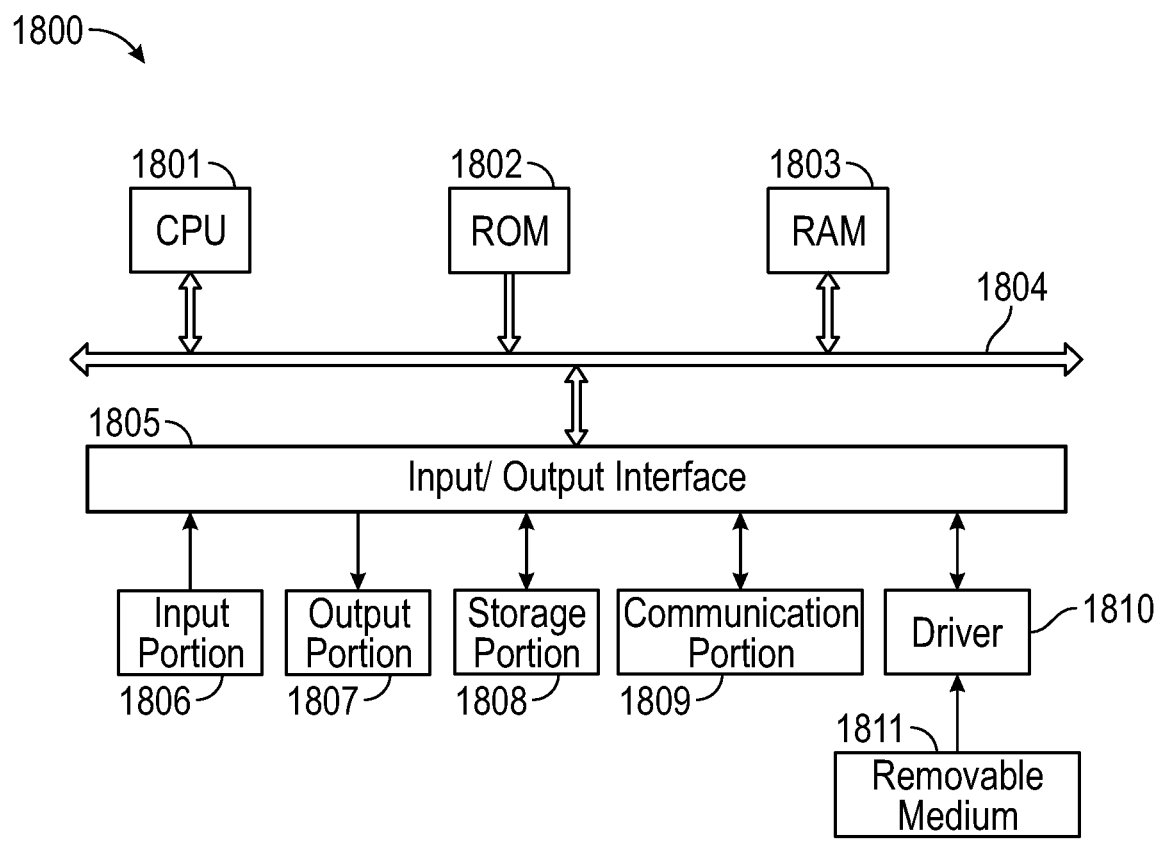
FIG. 21 shows a block diagram of an exemplary structure of a general-purpose personal computer with which the method, device and/or system according to embodiments of the present disclosure are implemented.

Referring to FIG. 21, a central processing unit (CPU) 1801 performs various processing based on programs stored in a read only memory (ROM) 1802 or programs loaded from a storage portion 1808 to a random access memory (RAM) 1803. In the RAM 1803, data required when the CPU 1801 performs the processing is also stored as required. The CPU 1801, ROM 1802, and RAM 1803 are connected to each other via a bus 1804. An input/output interface 1805 is also connected to the bus 1804.

The following components are connected to the input/output interface 1805: an input portion 1806 including a keyboard, a mouse or the like, an output portion 1807 including a display such as a Cathode Ray Tube (CRT) and a Liquid Crystal Display (LCD), a speaker or the like, the storage portion 1808 including a hard disk or the like, and a communication portion 1809 including a network interface card such as a LAN card, a modem or the like. The communication portion 1809 performs communication processing via a network such as the Internet. If necessary, a driver 1810 may also be connected to the input/output interface 1805. A removable medium 1811 such as a magnetic disk, an optical disk, a magneto-optical disk, a semiconductor memory or the like is mounted on the driver 1810 as necessary, such that a computer program read from the removable medium 1811 is installed in the storage portion 1808.

In a case that the above-mentioned series of processing is implemented by software, a program constituting the software is installed from the network such as the Internet or the storage medium such as the removable medium 1811.

It should be understood by those skilled in the art that the storage medium is not limited to the removable medium 1811 shown in FIG. 21 in which the program is stored and which is distributed separately from the device so as to provide the program to the user. Examples of the removable medium 1811 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1802, the hard disk included in the storage portion 1808 or the like. Herein, the program is stored in the storage medium, and the storage medium is distributed to the user together with the device including the storage medium.

It should be further noted that, in the device, method and system according to the present disclosure, components or steps may be decomposed or recombined. The decomposing and/or recombining should be regarded as equivalent solutions of the present disclosure. Steps for performing the above series of processing may be naturally performed in a time order according to the order described above, but the steps are not necessarily performed in the time order. Some steps may be performed in parallel or independently from each other.

Finally, it should be further noted that terms of "include", "comprise" or any other variants in the embodiments of the present disclosure are intended to be non-exclusive. Therefore, a process, method, article or device including a series of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

Although the embodiments of the present disclosure are described above in conjunction with the drawings, it should be understood that the embodiments are only used to illustrate the present disclosure rather than limit the present disclosure. For those skilled in the art, various changes and modifications may be made for the embodiments without departing from the essence and scope of the present disclosure. Therefore, the scope of the present disclosure is defined only by appended claims and equivalent meaning thereof.

Modules and units of the above device may be configured by software, firmware, hardware or a combination thereof. Specific means or methods for configuring are well known to those skilled in the art, and are not described in detail herein. In a case of implementing by software or firmware, a program constituting the software is installed from the storage medium or network to a computer with a dedicated hardware structure, which can perform various functions when various programs are installed thereon.

In a case that the above-mentioned series of processing is implemented by software, a program constituting the software is installed from the network such as the Internet or the storage medium such as the removable medium.

It should be understood by those skilled in the art that the storage medium is not limited to the removable medium in which the program is stored and which is distributed separately from the device so as to provide the program to the user. Examples of the removable medium include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM, the hard disk included in the storage portion or the like. Herein, the program is stored in the storage medium, and the storage medium is distributed to the user together with the device including the storage medium.

Furthermore, a program product storing machine-readable instruction codes is further provided according to the present disclosure. The instruction codes, when being read and executed by a machine, can perform the method according to the embodiment of the present disclosure.

Accordingly, a storage medium for carrying the above program product storing machine-readable instruction codes is also included in the present disclosure. The storage medium includes but is not limited to a floppy disk, an optical disc, a magneto-optical disk, a memory card, a memory stick or the like.

Finally, it should be further noted that the relationship terminologies such as left, right, first, second or the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

Although the present disclosure is disclosed by the description of specific embodiments of the present disclosure above, it should be understood that, for those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. A control device for a wireless communication apparatus, comprising:
control circuitry configured to:
cause a plurality of wireless communication apparatuses to transmit a plurality of synchronization sequence signals which are different from each other to a mobile terminal, and
configure each of the plurality of synchronization sequence signals to comprise a first sub-sequence and a second sub-sequence, wherein the second sub-sequences of the respective synchronization sequence signals are cyclic shift sequences which are different from each other.

2. The control device for a wireless communication apparatus according to claim 1, wherein the first sub-sequence is used for the mobile terminal to estimate, after receiving the synchronization sequence signals, a relative propagation time delay difference with respect to the received synchronization sequence signals, and the second sub-sequence is used for the mobile terminal to estimate, after receiving the synchronization sequence signals, an absolute timing synchronization position of each of the synchronization sequence signals.

3. The control device for a wireless communication apparatus according to claim 1, wherein the control circuitry is configured to calculate, according to a maximum geographical distance between adjacent wireless communication apparatuses, a cyclic shift value between the second sub-sequences of the synchronization sequence signals transmitted from the adjacent wireless communication apparatuses.

4. The control device for a wireless communication apparatus according to claim 1, wherein the first sub-sequence and the second sub-sequence satisfy the following conditions:

(i) an auto-correlation value indicating auto-correlation of each of the first sub-sequence and the second sub-sequence is lower than a first predetermined threshold;

(ii) a cross-correlation value indicating cross-correlation between the first sub-sequence and the second sub-sequence is lower than a second predetermined threshold; and (iii) the second sub-sequence has a shift-and-add property.

5. The control device for a wireless communication apparatus according to claim 1, wherein the auto-correlation values of the first and/or second sub-sequences go to zero; and/or the cross-correlation value between the first and second sub-sequences goes to zero.

6. The control device for a wireless communication apparatus according to claim 1, wherein the second sub-sequence is a maximum periodic linear shift register sequence.

7. A control apparatus comprising the control device for a wireless communication apparatus according to claim 1, wherein the control apparatus is implemented by one of the plurality of wireless communication apparatuses or by a controller for the wireless communication apparatus.

8. A control method for a wireless communication apparatus, comprising: causing a plurality of wireless communication apparatuses to transmit to a mobile terminal a plurality of synchronization sequence signals which are different from each other, and configuring each of the synchronization sequence signals to comprise a first sub-sequence and a second sub-sequence, wherein the second sub-sequences of the respective synchronization sequences are cyclic shift sequences which are different from each other.

* * * * *